(12) United States Patent
Katardjiev et al.

(10) Patent No.: US 10,762,136 B2
(45) Date of Patent: Sep. 1, 2020

(54) TAG-BASED, USER DIRECTED MEDIA RECOMMENDATIONS

(71) Applicant: TELEFONAKTIEBOLAGET LM ERICSSON (PUBL), Stockholm (SE)

(72) Inventors: Vladimir Katardjiev, Santa Clara, CA (US); Alvin Jude Hari Haran, Sunnyvale, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 427 days.

(21) Appl. No.: 15/705,886

(22) Filed: Sep. 15, 2017

(65) Prior Publication Data

US 2019/0087435 A1    Mar. 21, 2019

(51) Int. Cl.

| G06F 16/00 | (2019.01) |
| G06F 16/9032 | (2019.01) |
| G06Q 30/06 | (2012.01) |
| G06F 16/23 | (2019.01) |
| G06F 16/903 | (2019.01) |
| G06F 16/904 | (2019.01) |

(52) U.S. Cl.
CPC ........ *G06F 16/90324* (2019.01); *G06F 16/23* (2019.01); *G06F 16/904* (2019.01); *G06F 16/90335* (2019.01); *G06Q 30/0631* (2013.01)

(58) Field of Classification Search
CPC ............. G06F 16/90324; G06F 16/904; G06F 16/90335; G06F 16/23; G06Q 30/0631
See application file for complete search history.

(56) References Cited

U.S. PATENT DOCUMENTS

| 7,668,821 B1 * | 2/2010 | Donsbach | G06Q 30/0631 |
| | | | 707/765 |
| 7,756,753 B1 * | 7/2010 | McFarland | G06Q 30/02 |
| | | | 705/26.1 |

(Continued)

OTHER PUBLICATIONS

H. Steck et al. "Interactive Recommender Systems", RecSys, Vienna, Sep. 16-20, 2015, pp. 359-360.

(Continued)

*Primary Examiner* — Alexander Khong

(57) ABSTRACT

A tag-based, user-directed media recommendation scheme is described herein. For example described herein is a recommender system (and method implemented by the recommender system) comprising: a recommendation engine configured to generate a recommendations list which includes a current set of recommendations for a user of a client device; and, a tag engine configured to: (1) receive the recommendations list; (2) obtain information about representative items associated with the user of the client device; (3) correlate the recommendations with tags; (4) correlate the representative items with the tags, (5) sort the tags into a tag list; and (6) provide the recommendations list and the tag list to the client device. The representative items include at least one of following: (1) an item previously purchased by the user; (2) an item previously watched by the user; (3) an item previously placed on a wish-list by the user; and (4) an item recommended by the recommendation engine for the user. Further described herein, are the client device and method implemented by the client device.

28 Claims, 11 Drawing Sheets

(56) References Cited

U.S. PATENT DOCUMENTS

| | | | | |
|---|---|---|---|---|
| 8,001,003 | B1* | 8/2011 | Robinson | G06Q 30/0201 705/14.53 |
| 9,111,219 | B1* | 8/2015 | Mohla | G06N 5/02 |
| 9,141,694 | B2 | 9/2015 | Lamere et al. | |
| 9,324,082 | B2* | 4/2016 | Johnson | G06F 16/9535 |
| 10,007,721 | B1* | 6/2018 | Klein | G06Q 50/01 |
| 2010/0161619 | A1* | 6/2010 | Lamere | G06Q 10/00 707/749 |
| 2012/0084657 | A1* | 4/2012 | Ranade | G06F 3/0481 715/733 |
| 2013/0332462 | A1* | 12/2013 | Billmaier | G06F 16/686 707/741 |
| 2014/0280005 | A1* | 9/2014 | Powers | G06F 16/951 707/706 |
| 2015/0074114 | A1* | 3/2015 | Saito | G06Q 30/06 707/740 |
| 2015/0302064 | A1* | 10/2015 | Knobloch | G06F 3/0482 707/722 |
| 2016/0019217 | A1 | 1/2016 | Reblitz-Richardson et al. | |
| 2016/0037227 | A1 | 2/2016 | Benn | |
| 2018/0144052 | A1* | 5/2018 | Sayyadi-Harikandehei | G06F 7/026 |
| 2019/0286673 | A1* | 9/2019 | Sayyadi-Harikandehei | H04N 21/231 |

OTHER PUBLICATIONS

J. Solomon "Heterogeneity in Customization of Recommender Systems by Users with Homogenous Preferences", Proceedings of the 2016 CHI Conference on Human Factors in Computing Systems, May 7-12, 2016, San Jose, CA, USA, 5 pages.

B.P. Knijenburg et al. "Each to His Own: How Different Users Call for Different Interaction Methods in Recommender Systems", Proceedings of the Fifth ACM Conference on Recommender Systems, RecSys'11, Oct. 23-27, 2011, Chicago, Illinois, USA, 8 pages.

C. Johnson et al., "Interactive Recommender Systems with Netflix and Spotify," Sep. 16, 2015. [Online]. Available: http://www.slideshare.net/MrChrisJohnson/interactive-recommender-systems-with-netflix-and-spotify/5-What_are_Interactive_RSsDefine_InteractiveInfluencing. [Accessed Jun. 7, 2016], 100 pages.

Y. Krishnamurthy et al. "Interactive Exploration for Domain Discovery on the Web" KDD 2016 Workshop on Interactive Data Exploration and Analytics (IDEA '16), Aug. 4, 2016, San Francisco, CA, USA, pp. 64-71.

Proceedings of the ACM SIGKDD 2017 Full-Day Workshop on Interactive Data Exploration and Analytics (IDEA 2017), Halifax, Nova Scotia, Canada, Aug. 14, 2017, 85 pages.

\* cited by examiner

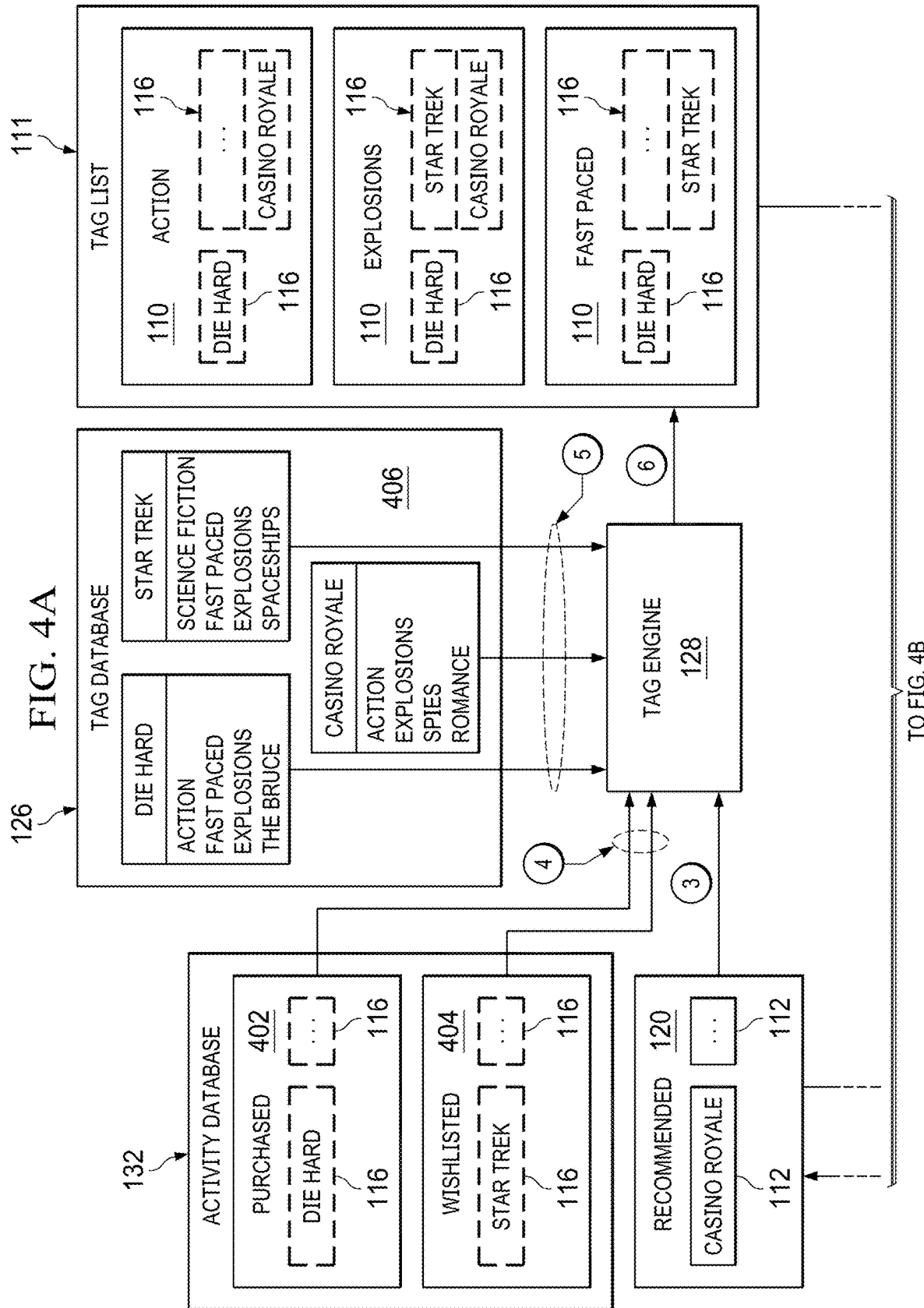

TAG-BASED, USER DIRECTED MEDIA RECOMMENDATIONS

TECHNICAL FIELD

The present disclosure relates to a tag-based, user-directed media recommendation scheme.

BACKGROUND

The following abbreviations are herewith defined, at least some of which are referred to within the following description of the present disclosure.
IDEA Interactive Data Exploration and Analytics
RAM Random Access Memory
VoD Video on Demand
VM Virtual Machine Current on-demand services such as Netflix, Spotify, MediaFirst and NuVu present a user with recommendations for consuming media. Recommendations are a way to present a sizeable catalog to the user. In the past, generating a set of recommendations typically resulted in using a non-interactive browsing mode which resulted in displaying a set of recommendations for the user. This, non-interactive browsing mode of displaying a set of recommendations as a browsing pattern for the user while being a good start, was not a complete solution and has been recognized as such in the art. A more detailed discussion about the non-interactive browsing mode and problems associated therewith is provided in H. Steck et al. "Interactive Recommender Systems," in RecSys, Vienna, 2015 (the contents of which are hereby incorporated herein by reference).

A promising solution to improve upon the non-interactive browsing mode is to provide some form of user interactive recommendations (user agency), where a next set of recommendations which is displayed for a user is a result of the user's actions. A more detailed discussion about user interactive recommendations (user agency) is provided in C. Johnson, "Interactive Recommender Systems with Netflix and Spotify," 16 Sep. 2015 see http://www.slideshare.net/MrChrisJohnson/interactive-recommender-systems-with-netflix-and-spotify/5-What_are_Interactive_RSsDefine_InteractiveInfluencing [Accessed 7 Jun. 2016] (the contents of which are hereby incorporated herein by reference). The user interactive mode in which the user is highly engaged with the recommendations requires the recommendation system to react quickly with providing relevant recommendations for the user in order to retain and inspire future user engagement. There have been many attempts to provide some form of user interactive recommendations (user agency), including: Y. Krishnamurthy et al. "Interactive Exploration for Domain Discovery on the Web" KDD 2016 Workshop on Interactive Data Exploration and Analytics (IDEA '16), Aug. 4, 2016, San Francisco, Calif., USA, 8 pages; Proceedings of the ACM SIGKDD 2017 Full-Day Workshop on Interactive Data Exploration and Analytics (IDEA 2017), Halifax, Nova Scotia, Canada, Aug. 14, 2017, 85 pages; U.S. Patent Publication No. 2016/0019217; U.S. Patent Publication No. 2016/0037227; and U.S. Patent Publication No. 2010/0161619 (the contents of these documents are hereby incorporated herein by reference).

This prior art all acknowledges the difficulty in generating recommendations to users, and the need to include user agency in the user interactive process. Further, this prior art all has the same substantive problem in that they do not properly address user agency versus serendipity. In short, when a user looks for a recommendation, they can express their desire in terms of a feeling, yet the prior art methods described above search for either an explicit tag, or a related tag. By performing this substitution, the user must perform many actions, such as adding a plurality of tags, before they reach a desired outcome. As a result, these prior art recommendation systems tend to become more of a search engine than a recommendation engine.

This weakness of the prior art recommendation systems is exemplified in U.S. Pat. No. 9,141,694 (the contents of which are incorporated herein by reference) which discloses that it may be desirable to use (apply) media items themselves in the search for the set of recommendations. What they do, then, is extract a tag cloud from the given item, and then use this tag cloud to provide the recommendations. This process has the same pitfalls as the above user interactive processes, including the reliance on the accuracy of the tags themselves.

There has also been research on using tags and interactive user settings to tags and/or labels which allows users to mutate the recommendations list. However, these approaches put limits on what the tags/attributes mean and what is investigated instead is a means of varying the weight(s) of the tags/attributes. This research has been discussed in following documents: (1) J. Solomon, "Heterogeneity in Customization of Recommender Systems By Users with Homogenous Preferences," in Proceedings of the 2016 CHI Conference on Human Factors in Computing Systems, 2016; and (2) B. P. Knijenburg et al. "Each to His Own: How Different Users Call for Different Interaction Methods in Recommender Systems," in Proceedings of the fifth ACM conference on Recommender systems, 2011 (the contents of these documents are hereby incorporated herein by reference). Hence, it can be appreciated that there is a need to address the aforementioned problems. This need and other needs are addressed herein by the present disclosure.

SUMMARY

A client device, a recommender system, and associated methods which address the aforementioned problems are described in the independent claims. Advantageous embodiments of the client device, the recommender system, and the associated methods are further described in the dependent claims.

In one aspect, the present disclosure provides a client device comprising a client application which enables a user visible interface to display: (1) a recommendations list which includes a current set of recommendations; and (2) a tag list which includes a current set of tags that are associated with the current set of recommendations, wherein each tag has one or more representative items associated therewith, and wherein each representative item is associated with a user of the client device. An advantage of the client device configured to perform these operations is that the tags are also assigned one or more representative items which were selected so as to be relevant to the user and this becomes useful when the user selects one of the tags when looking at the recommend items and the corresponding representative items and not just the selected tag are communicated to a recommendation engine which uses this information to provide the user a new (more relevant) set of recommendations.

In another aspect, the present disclosure provides a method in a client system for implementing a tag-based, user-directed media recommendation scheme. The method comprises enabling a user visible interface to display: (1) a recommendations list which includes a current set of recommendations; and (2) a tag list which includes a current set of tags that are associated with the current set of recommendations, wherein each tag has one or more representative items associated therewith, and wherein each representative item is associated with a user of the client device. An advantage of the method with these steps is that the tags are also assigned one or more representative items which were selected so as to be relevant to the user and this becomes useful when the user selects one of the tags when looking at the recommend items and the corresponding representative items and not just the selected tag are communicated to a recommendation engine which uses this information to provide the user a new (more relevant) set of recommendations.

In yet another aspect, the present disclosure provides a recommender system comprising a recommendation engine and a tag engine. The recommendation engine is configured to generate a recommendations list which includes a current set of recommendations for a user of a client device. The tag engine is configured to: (1) obtain the recommendations list; (2) obtain information about representative items associated with the user of the client device; (3) correlate the recommendations with tags; (4) correlate the representative items with the tags, (5) sort the tags into a tag list; and (6) provide the recommendations list and the tag list to the client device. An advantage of the recommender system configured to perform these operations is that the tags are also assigned one or more representative items which were selected so as to be relevant to the user and this becomes useful when the user selects one of the tags when looking at the recommend items and the corresponding representative items and not just the selected tag are communicated to the recommendation engine which uses this information to provide the user a new (more relevant) set of recommendations.

In still yet another aspect, the present disclosure provides a method in a recommender system which comprises a recommendation engine and a tag engine for implementing a tag-based, user-directed media recommendation scheme. The method comprises a generating step, a first obtaining step, a second obtaining step, a first correlating step, a second correlating step, a sorting step, and a providing step. In the generating step, the recommendation engine generates a recommendations list which includes a current set of recommendations for a user of a client device. In the first obtaining step, the tag engine obtains the recommendations list. In the second obtaining step, the tag engine obtains information about representative items associated with the user of the client device. In the first correlating step, the tag engine correlates the recommendations with tags. In the second correlating step, the tag engine correlates the representative items with the tags. In the sorting step, the tag engine sorts the tags into a tag list. In the providing step, the tag engine provides the recommendations list and the tag list to the client device. An advantage of the method with these steps is that the tags are also assigned one or more representative items which were selected so as to be relevant to the user and this becomes useful when the user selects one of the tags when looking at the recommend items and the corresponding representative items and not just the selected tag are communicated to the recommendation engine which uses this information to provide the user a new (more relevant) set of recommendations.

Additional aspects of the present disclosure will be set forth, in part, in the detailed description, figures and any claims which follow, and in part will be derived from the detailed description, or can be learned by practice of the disclosure. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings:

FIGS. 4A-4B is an illustration of an exemplary application data model flow performed by the client device, the media service system, and the recommender system when implementing the tag-based, user-directed media recommendation scheme in accordance with an embodiment of the present disclosure;

DETAILED DESCRIPTION

Figure 1:
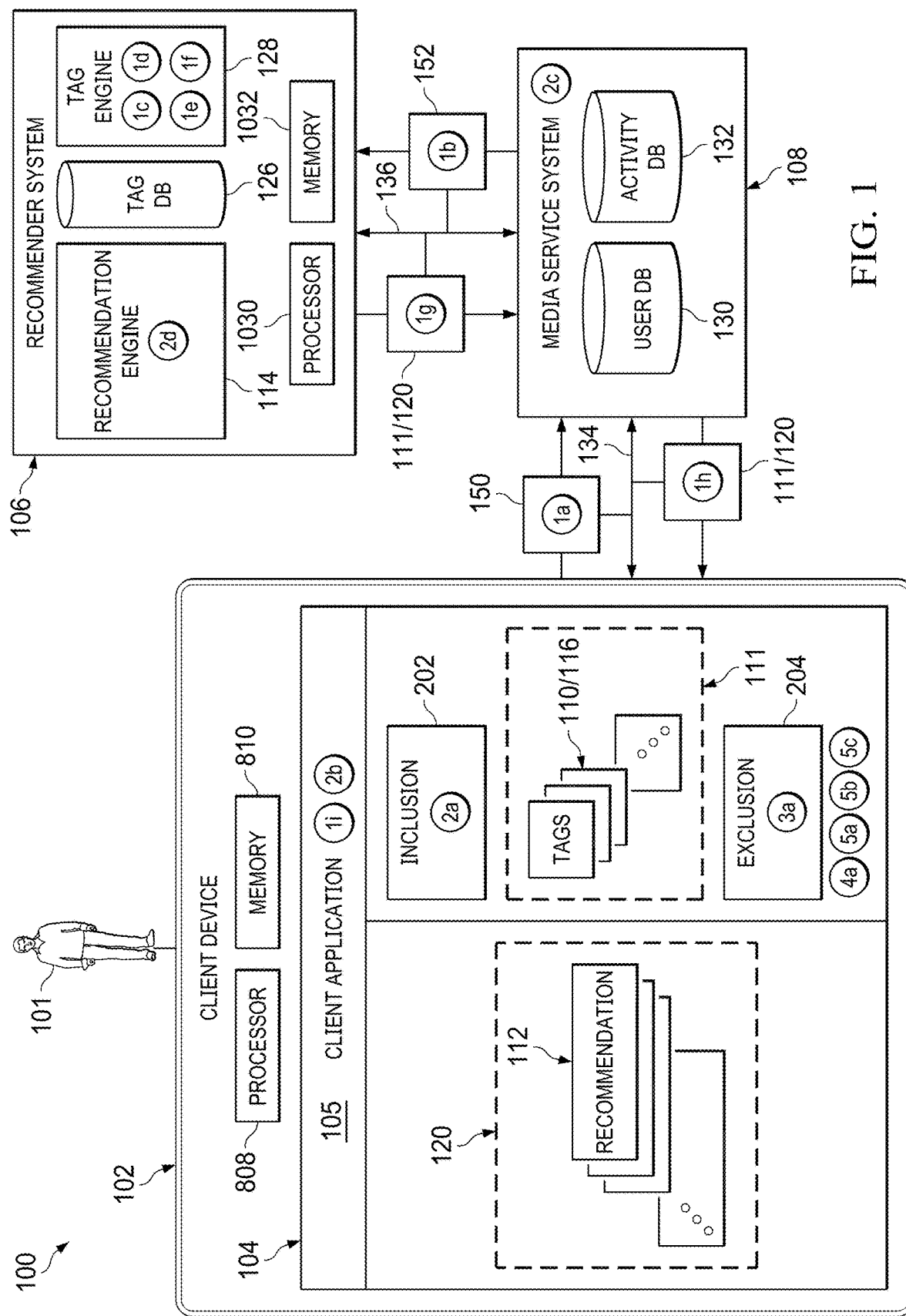
FIG. 1 is a basic diagram of a system including a client device, a media service system, and a recommender system that implement a tag-based, user-directed media recommendation scheme in accordance with an embodiment of the present disclosure.

Referring to FIG. 1, there is shown a basic diagram of a system 100 that implements a tag-based, user-directed media recommendation scheme in accordance with an embodiment of the present disclosure. The system 100 comprises a client device 102 (which implements a client application 104), a recommender system 106, and a media service system 108. As will be discussed in detail below, the system 100 is configured to allow a user 101 to interact with their client device 102 and in particular their client application 104 (see FIG. 2 for an exemplary client application 104) to use interactive relatable tags 110 to manipulate a set of recommendations 112. For example, starting from a set of recommendations 112 and relatable tags 110 in their client application 104, the user 101 can manipulate (interact with) the relatable tags 110 to change the recommendations 112 by moving (removing) relatable tag(s) 110 from the tag list 111 to an inclusion list 202 (see FIG. 2's inclusion list 202) to narrow down the next set of recommendations 112, and by moving (removing) relatable tag(s) 110 from tag list 111 to an exclusion list 202 (see FIG. 2's exclusion list 204) to broaden the next set of recommendations 112.

The recommender system 106 can apply an item (or hybrid) based recommendation engine 114 while the user 101 interacts with the relatable tags 110 to add to inclusion list 202 and/or exclusion list 204. For instance, when the user 101 interacts with a specific relatable tag 110 to add to the inclusion list 202 or exclusion list 204 then the recommendation engine 114 can use one or more representative items 116 transparently assigned to that relatable tag 110 to determine a next set of recommendations 112. The representative items 116 can be movies, series or other items, associated with the given tag 110 that either the user 101 has watched, or are items that the recommendation engine 114 would have recommended to the user 101 for that given tag 110. The representative items 116 are associated with relatable tags 110 but are not visible to the user 101 (see FIG. 3). The recommendation engine 114 instead of processing the relatable tag 110 uses the associated representative item(s) 116 to find the next set of recommended items 112 (similar items 112) and present the next set of recommended items 112 (similar items 112) to the user 101. The following are some definitions of terms used herein:

Item/Media Item: A library object representing a movie, TV series, or possibly episodes/clips. An item can include (for example): movie, a trailer, a television series, and a television series episode.

Recommended Item 112: A media item that the recommendation engine 114 identifies that may be of interest to the user 110. This item is recommended on the basis of the item's own properties, and the user's profile. This item may be used for further internal uses (e.g. representative items) or displayed to the user 101.

Representative Item(s) 116: One or more items that may be represented in any of the lists of items the user 101 has watched, items the user 101 has interacted with (e.g. bought, rented, added to some list), or selected by the recommendation engine 114 as a representative item 116.

Note: Although only one user 101 and one client device 102 is shown and described herein for clarity, it should be appreciated that the system 100 is able to and would typically interact with any number of users 101 and client devices 102.

An advantage of this approach is that a human-relatable tag 110 with associated representative item(s) 116 can be used to represent a well-known input for the recommendation engine 114. These well-known items (representative items 116) are selected so as to be relevant to the user 101 and to communicate more information to the recommendation engine 114 than merely the selected tag 110. For example, the ACTION tag 110 can be represented generally both by the Star Trek movie and the Die Hard movie, but similar movies to these two movies would be highly different. In the present disclosure, the recommendation engine 114 would select well-known items (representative items 116) such as the Star Trek movie (rather than the Die Hard movie) which based on the user's profile (obtained from the user database 130 in the media service 108), allowing these representative items 116 to be contained as context to the tags 110 that are selected by the user 101. Then, the recommendation engine 114 would use the representative items 116 (e.g., the Star Trek movie rather than the Die Hard movie) to determine the next set of recommendations 112.

The following is a discussion with respect to FIG. 1 that describes exemplary embodiments of the client device 102 (which implements the client application 104), the recommender system 106, and the media service system 108, and also describes exemplary ways how the client device 102 (which implements the client application 104), the recommender system 106, and the media service system 108 can interact with one another to provide recommended items 112 to the user 101 in accordance with the tag-based, user-directed media recommendation scheme the present disclosure.

The Client Device 102:

The client application 104 with a user visible interface 105 has the following:

A recommendations list 120 which may be a list, grid, or other display type that highlights a set of recommendations 112. See also FIG. 2's recommendations list 120 and set of recommendations 112.

Figure 3:
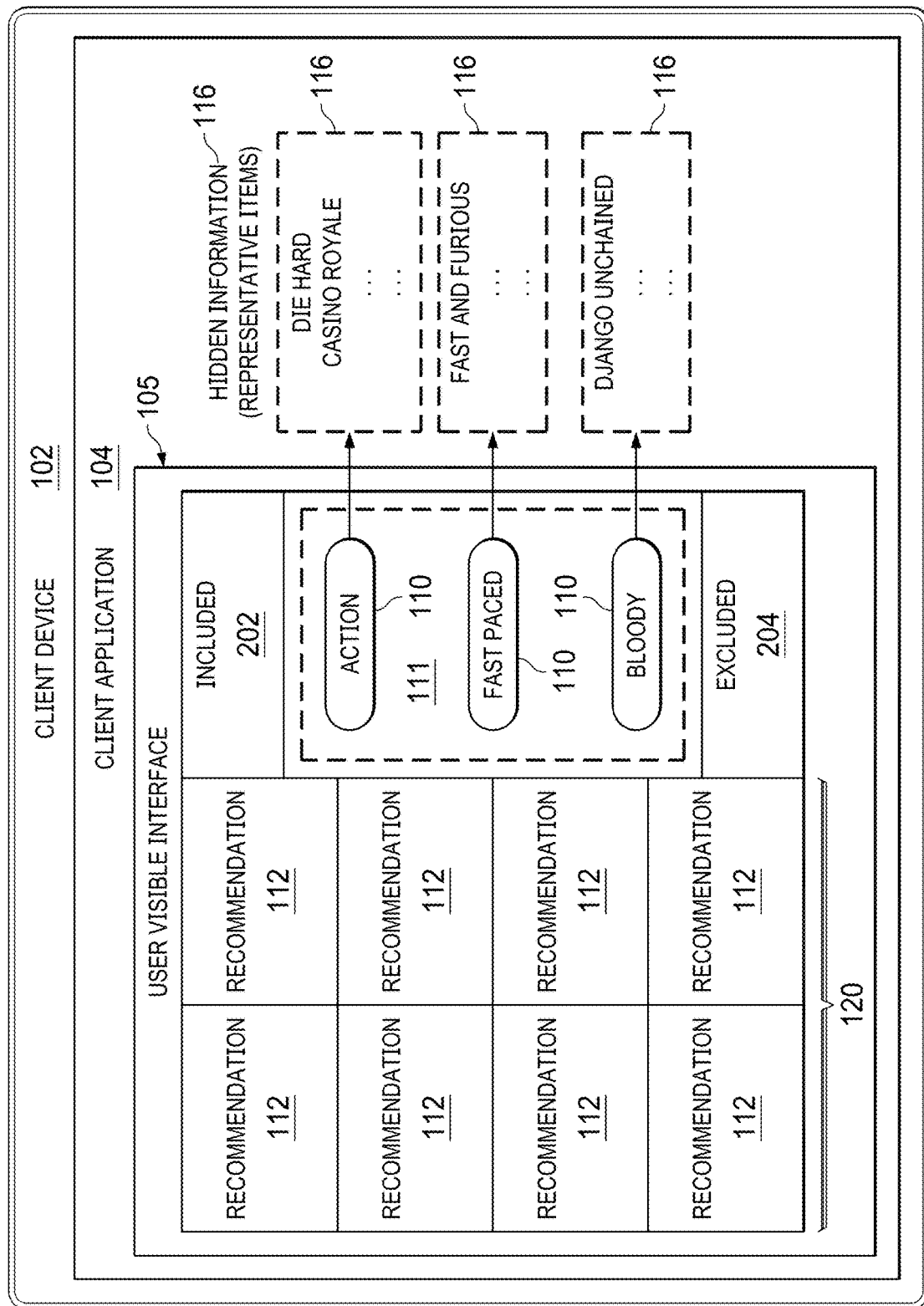
FIG. 3 is a diagram of another exemplary client device configured to have a recommendations list (left side) and a tag list (right side) in accordance with an embodiment of the present disclosure.

An interactive element 122 which contains:

A tag list 111 with number of tags 110, each of which has one or more representative items 116, each tag 110 containing an ID that represents exactly one recommended item 112, and containing one or more IDs that represent one or more representative items 116 (see FIG. 3). Note: All items in the tag list 111 associated with a tag 110 are considered "representative items 116", even though some may come from the recommending engine 114, purchase history, actions, etc. . . . . . A tag 110 is guaranteed to contain, one or more representative items 116 (variable number based on user's history), and at least one corresponding item 112 from the recommendations list 120. An item is only a recommendation 112 when displayed as a recommendation 112.

Figure 2:
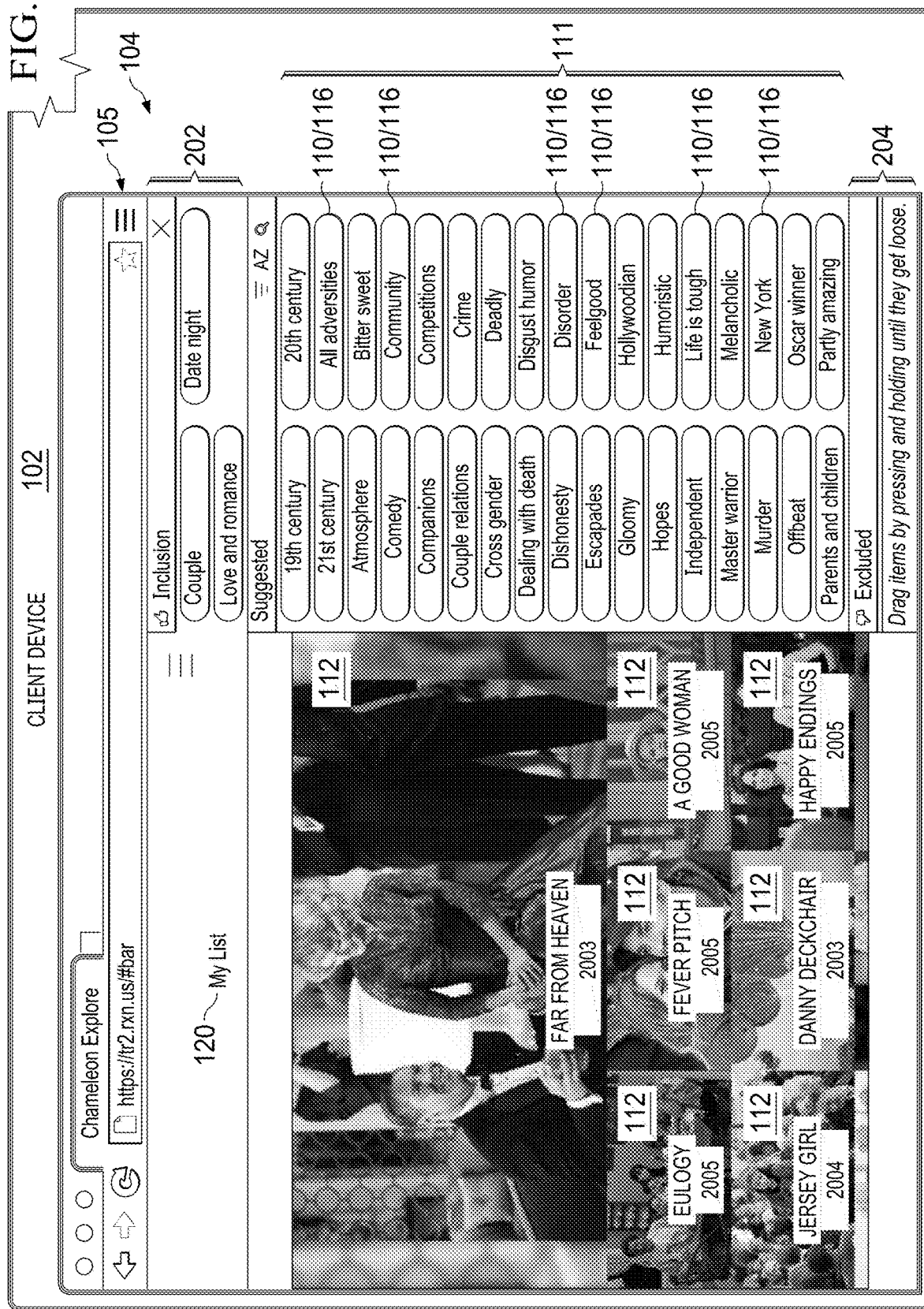
FIG. 2 is a diagram of an exemplary client device configured to have a recommendations list (left side) and a tag list (right side) in accordance with an embodiment of the present disclosure.

User Interactive features that enables the user 101 to possibly:

Select any tag 110 for inclusion or exclusion (see FIGS. 2 and 3's inclusion list 202 and exclusion list 204)

Figure 5:
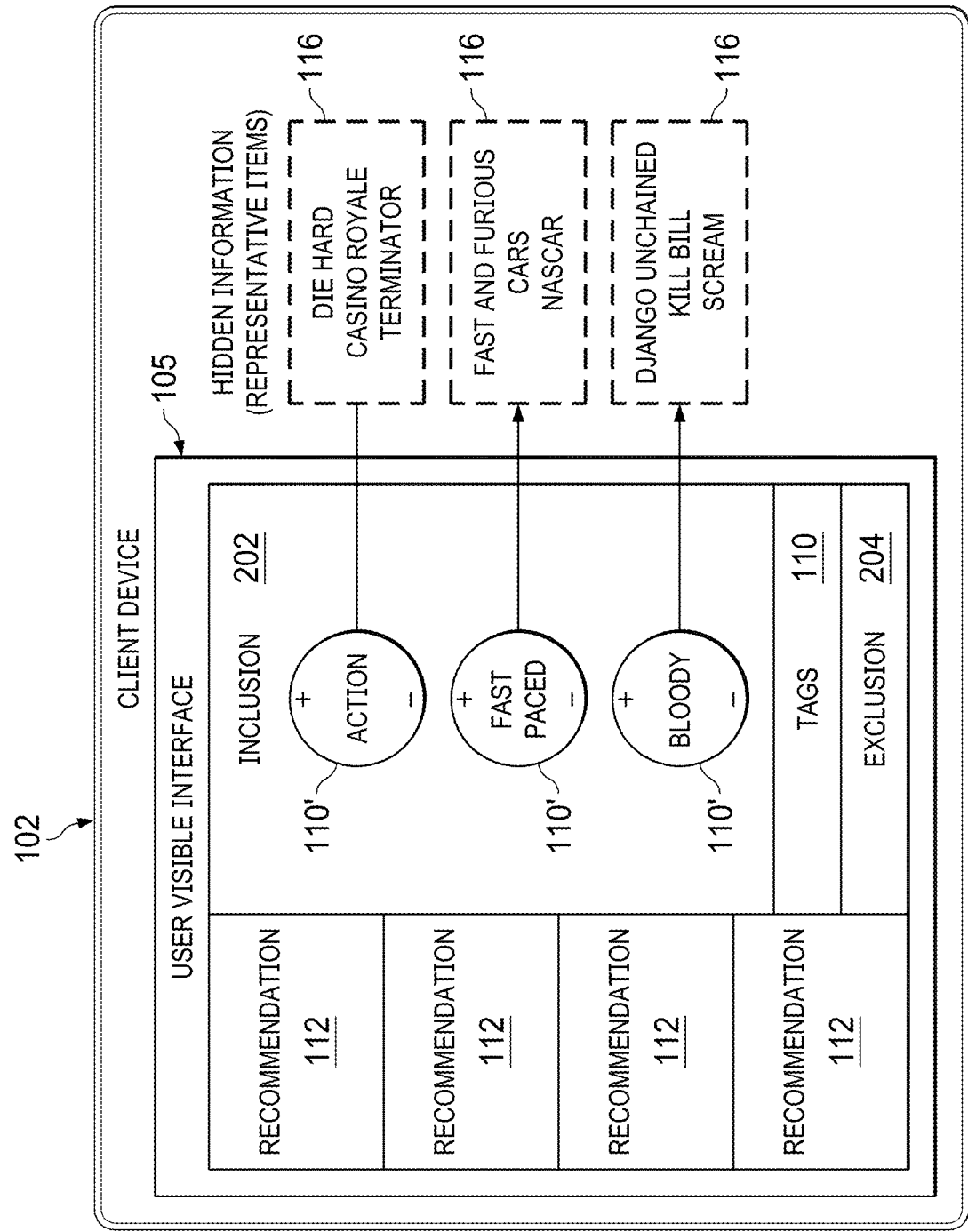
FIG. 5 is a diagram of another exemplary client device configured to have a recommendations list (left side) and a tag list (right side) which has weighted tags in an inclusion section in accordance with an embodiment of the present disclosure.

Assign importance to selected tags 110 (see FIG. 5)

The Recommender System 106:

The recommendation engine 114 which is configured as discussed in detail herein to provide recommendations 112 to the user 101 (only one shown). The recommendation engine 114 can be, for example, a collaborative filtering engine, a metadata engine, a hybrid engine, or any other type of engine that can take movie, user and other data and provide a recommendation 112 (see more detailed discussion below).

A tag database 126 which has tags assigned to each item. The tag database 126 is aware of which item ID (associated with which recommendation 112 and representative item 116) is represented by which tags 110.

A tag engine 128 which can translate tags 110 to (media) recommended items 112 and vice versa. Basically, the tag engine 128 receives the recommendations 112 from the recommendation engine 114, and receives from the media service 108 other items (representative items 116) that the user 101 has interacted with such as, for example, purchased items, wish-listed items, watched items etc. . . . and correlates theses items 112 and 116 with the tags 110 associated with all of these items 112 and 116 obtained from the tag database 126, and sorts them into the tag list 111. The tag list 111 has multiple tags 110 with one entry per tag 110 which includes the tag name, the corresponding recommended item 112, and the set of representative items 116.

The Media Service System 108:

One or more user databases 130 that are configured to track which user(s) 101 is/are logged into the recommender system 106/media service 108.

One or more activity databases 132 which are configured to know which items (representative items 116) a user 101 has bought, watched or otherwise interacted with in the past.

It should be appreciated that the client device 102 can be any type of device such as, for example, a television, tablet, or mobile device. In one example, the client device 102 would have a network link 134 established to the media service 108 which could be implemented in a cloud environment. The recommender system 106 would also have a network link 136 to the media service system 108. The recommender system 106 could be implemented in the same cloud environment or a different cloud environment as the media service system 108 but would typically be deployed in at least a logically separated environment (e.g. different VM or set of VMs). The split between the media system 108 and the recommender system 106 could be because of the large resource requirements of the recommender system 106 which could require hundreds of gigabytes of RAM, and many execution cores to meet the computing requirements to implement the tag-based, user-directed media recommendation scheme of the present disclosure. The media service system 108 also maintains the state (e.g., users logged in/out) of many users 101 where this state should not be divulged without it being a breach of privacy.

Exemplary Use

The following steps describe an exemplary use of the system 100. There are multiple branching paths the user 101 may take when interacting with the system 100. For example, as will be understood from the following discussion one path is 1abcdef, and another path is 3abc as follows:

1. The user 101 activates the client application 104 (e.g., see FIG. 2).
   a. The client applicant 104 creates a recommendations request 150, and sends the recommendations request 150 to the media service system 108.
   b. The media service system 108 maps the user ID and sends a request 152 to the recommender system 106 and in particular the recommendation engine 114 to determine and provide the most likely recommended items 112 for the user 101.
   c. The tag engine 128 maps the recommended items 112 with the corresponding tags 110 and metadata from the tag database 126.
   d (optional). The tag engine 128 removes any recommended items 112 that contain the tag(s) 110 specified in the excluded list 204.
   e. The tag engine 128 takes tags 110 associated with the recommended items 112 and forms a tag list 111. Then, the tag engine 128 adds at least one representative item 116 to each tag 110. Reference is made to FIG. 3 which is a detailed example of the client device 102 displaying the recommendations list 120 including the recommended items 112, and displaying the tag list 111 including 122 including the tags 110 and their respective hidden representative items 116, the inclusion list 202, and the exclusion list 204. Recall: the tags 110 in the tag list 111 are displayed to the user 110 while each tag 110 has associated therewith a number of representative items 116 which are in the background, and unbeknownst to the user 101. The representative items 116 may come from the recommendation engine 114, or the user's viewing, shopping, watching or other history. The tag engine 128 may query the user's activity database 132 and include some or all of the items the user 110 has viewed, bought and/or rated in the representative items 116.
   f (optional). The tag engine 128 may sort and rank the recommendations 112 in the recommendations list 120 based on the recommended order, likelihood of watching, or activity date.
   g. The tag engine 128 returns both the recommendations list 120 including the recommended items 112, and the tag list 111 including the tags 110 (with representative items 116) to the media service system 108.
   h. The media service system 108 returns both the recommendations list 120 including the recommended items 112, and the tag list 111 including the tags 110 (with the associated representative items 116) to the client device 102.
   i. The client application 104 renders the new recommendations 112 from the recommendations list 120, and shows the new tags 110 from the tag list 111.

2. The user 110 selects a tag 110 from the tag list 111 and adds the selected tag 110 to the inclusion list 202.
   a. The selected tag 110 (e.g., love and romance tag 110 in FIG. 2) is added to the inclusion list 202, and visually shown to the user 101 to have moved from the tag list 111 to the inclusion list 202. The selected tag 110 may optionally be removed from the tag list 111. Additionally, one or more representative items 116 associated with the selected tag 110 may be instantly rendered as a recommendation 112 in the recommendations list 120.
   b. The client application 104 creates a new list containing one representative item 116 ID from each tag 110 in the included list 202 and the excluded list 204 (if any are added to the exclude list 204—see step 3 discussed below in which the user 101 adds a tag 110 to the exclusion list 204). Thereafter, the client application 104 sends the new list in a request for new recommendations 112 to the media service system 108. If no items are found in the inclusion list 202 or the exclusion list 204, then return to step 1a and continue.
   c. The media service 108 receives and authenticates the new list from step 2b and sends the user ID, and the request data (i.e., the new list), to the recommender system 106.
   d. The recommendation engine 114 is asked to provide new recommended items 112 that are jointly similar to the representative items 116 in the inclusion list 202, and jointly dissimilar to the representative items 116 from the exclusion list 204 (note: jointly similar and dissimilar mean that, from the point of view of the recommendation engine 114 that the similarity error has been minimised with respect to the given items). It should be noted that the inventors have conducted tests, where several representative items 116 (multiple representative IDs) from the same tag 110 unduly biased the Collaborative Filtering towards including items (i.e. it would easily fall into a local minima), producing results with less variation, i.e. the serendipity that users are looking for.
   e. Continue to step 1c and onwards.

3. The user 101 selects a tag 110 from the tag list 111, and adds the selected tag 110 to the exclusion list 204.
   a. The selected tag 110 is added to the excluded list 204, and visually shown to have moved from the tag list 111 to the exclusion list 204. The selected tag 110 may optionally be removed from the suggested tag list 111. Optionally, the displayed recommendations 112 that share a plurality of tags with the excluded tag 110 may be instantly hidden from the recommendations list 120 viewable to the user 101.

b. Continue in step 2b and onwards

4. The user 101 removes a tag 110 previously added to the inclusion list 202 or the exclusion list 204.

a. The tag 110 is visually removed from the corresponding list 202 or 204, i.e., the inclusion list 202 or the exclusion list 204. Optionally, the tag 110 may be re-added to the suggested tag list 111.

b. Run step 2b and onwards

5. The user 100 selects a title from the recommendations (112), and adds the selected title to the inclusion list 202 or the exclusion list 204.

a. The selected title is converted by the client application 104 into a tag 110.

b. The new tag 110 (based on the selected title) has, as its representative ID namely the ID of the title used to create the tag 110.

c. The new tag 110 is added to the inclusion list 202 or exclusion list 204.

Exemplary Data Model Flow

Figure 4B:
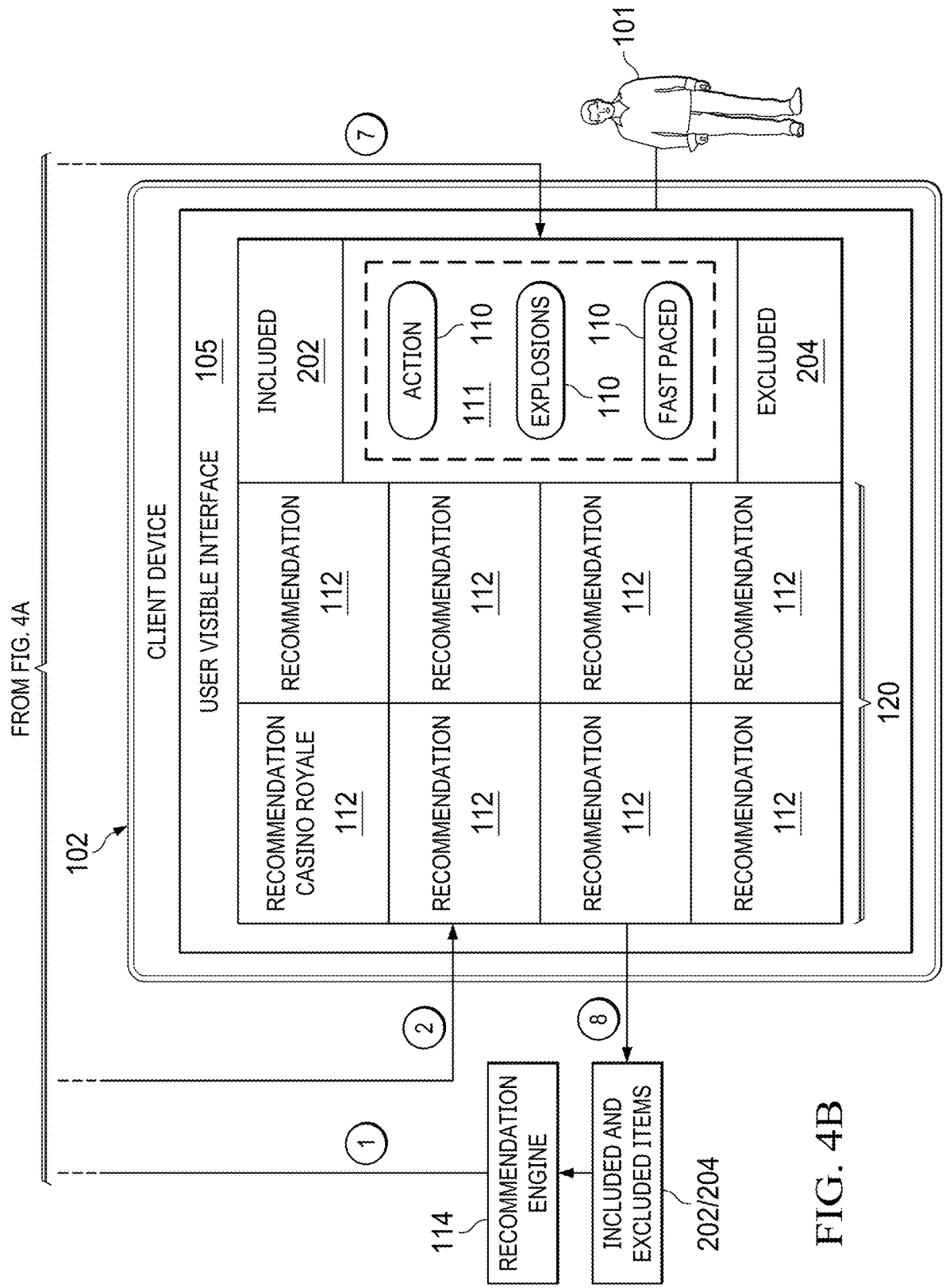

Referring to FIGS. 4A-4B, there is an illustration of an exemplary application data model flow performed by the client device 102, the media service system 108, and the recommender system 106 when implementing the tag-based, user-directed media recommendation scheme in accordance with an embodiment of the present disclosure. The purchased items 402 (including the Die Hard movie etc. . . . ) and the wish-listed items 404 (including the Star Trek movie) are examples of user information associated with the user 101 that is stored in the activity database 132. The recommendations list 120 with the recommendations 112 (including the Casino Royale movie etc. . . . ) is the output of the recommendation engine 114 for the user 101 that can include taking into account the given inclusion items 202 and the exclusion items 204. The tag engine 128 selects tags 110 from the movie metadata 406 stored in the tag database 126 and generates the tag list 111, i.e. a list of tags 111 associated with a number of representative items 116 obtained from the activity database 132, with duplicates allowed. In this example, the tag list 111 includes the following: (1) Action tag 110 with representative items 116 including the Die Hard movie and the Casino Royale movie; (2) Explosions tag 110 with representative items 116 including the Die Hard movie, the Casino Royale movie, and the Star Trek movie; and (3) Fast Paced tag 110 with representative items 116 including the Die Hard movie, and the Star Trek movie. It should be appreciated that as the items 110 in the inclusion list 202 and the exclusion list 204 change, this works as a feedback loop which can and will cause the representative items 116 in the tag list 111 to change as well. The user 101 would interact with the client device 102 that displays the recommendations list 120 (including the Casino Royale movie 112 etc. . . . ), the tag list 111 (including the Action tag 110, the Explosions tag 110, and the Fast Paced tag 110), the inclusion list 202, and the exclusion list 204. More specifically, the illustrated exemplary application data model flow includes the following flows:

Initial Load (Similar to FIG. 1's Path 1abc . . . )

The user 101 initially loads the client application 104 and the inclusion list 202 and exclusion list 204 are empty (note: the client application 104 may elect to hide the fields for the inclusion list 202, the exclusion list 204, and the tag list 111 to start with, and only display them based on a prompt for the user 101). At the start, the recommender system 106 provides a set of recommendations 112 which can be based off of the user profile alone (see FIG. 4's step 1). These recommendations 112 are made into a recommendations list 120 and sent to the client device 102 (see FIG. 4's step 2). At the same time, the tag engine 128 receives the recommendations 112 (see FIG. 4's step 3), along with information about representative items 116 the user 101 has interacted with such as, for example, purchased items, wish-listed items, watched items etc. . . . (see FIG. 4's step 4) and correlates them with the tags 110 (metadata 406) obtained from the tag database 126 (see FIG. 4's step 5), and sorts them into the tag list 111 (see FIG. 4's step 6). The tag list 111 has multiple tags 110 with one entry per tag 110 including the tag name, and the set of representative items 116. The tag list 111 is provided to the client device 102 (see FIG. 4's step 7). These two lists namely the recommendations list 120 and the tag list 111 can be sent simultaneously or separately by the recommender system 106 to the client device 102.

Basic User Interaction (Similar to FIG. 1's Paths 2 (Inclusion) and 3 (Exclusion))

The user 101 can add tag(s) 110 to the inclusion list 202 (FIG. 1's flow 2) and/or to the exclusion list 204 (FIG. 1's flow 3). For example, using FIG. 4's titles and tags, the user 101 can place the Explosions tag 110 in the inclusion list 202 and the user interface section could end up with the Star Trek movie in the inclusion list 202. Later, the user 101 by moving the Fast Paced tag 110 to the exclusion list 204 could result in adding the Die Hard movie to the exclusion list 204. The inclusion list 202 and the exclusion list 204 are forwarded by the client device 102 to the recommendations engine 114 (see FIG. 4's step 8). The recommendations engine 114 upon receiving the inclusion list 202 and/or the exclusion list 204, triggers a cascading operation that causes the recommendations engine 114 to recalculate the recommendations 112, and, because the recommendations 112 change, the tags 110 as well as the representative items 116 for those tags 110 can change. Note: for the purpose of system consistency, it is desired to avoid an infinite loop where in the system 100 per the present disclosure this chain is broken in the client device 102. For example, if the system 100 operation results in a change of the "Explosions" tag, the client device 102 will not automatically read the new representative items list for any items the user 101 has already placed in the inclusion list 202 and/or the exclusion list 204. For any subsequent request (until and unless the user 101 removes the tag 110 from the inclusion list 202 and/or the exclusion list 204), the representative item lists for those items will remain identical to the point in time at which the user 101 added them to the inclusion list 202 and/or the exclusion list 204. This keeps the user interface results consistent from the user's perspective (i.e. adding an item and then "undoing" the action by removing the same action will bring back the same list). Only tags 110 that the user 101 has not placed into an included list 204 or the excluded list 204 will be updated to contain the new representative item lists.

If desired, when tag(s) 110 are added to the exclusion list 204, the local client device 102 can immediately remove certain recommended item(s) 112 which correspond to the added tag(s) 110 from being displayed to the user 101. This instant feedback can improve user experience. And, when tag(s) 110 are added to the inclusion list 202, the local client device 102 can immediately add (before receiving a new set of recommended items 112) and display recommended item(s) 112 that correspond to the representative item(s) 116 from the selected tag(s) 110. This instant feedback can also improve user experience.

Alternative Embodiment 1

The system 100 can, in a different configuration, be used to provide browsing for weighted tags 110'. In a weighted tag scenario, the user 101 can assign or otherwise indicate the importance of all or some of the selected tags 110', either by giving them a value within a value range, such as [0-100] or (−∞, +∞), or by sorting them in the order of most to least important, or by using any other ranking method (see FIG. 5). Once the ranking of the tags 110' is completed the client application 104 processes the tag list 111, and for each weighted tag 110' takes a number of associated IDs of representative items 116 proportional to the weight of the corresponding tag 110'. There are many different ways that this proportion can be used to determine the number of associated IDs of representative items 116 that are added to the corresponding tags 110 in view of the weight of the corresponding tags 110'. One exemplary way is to use a fixed target list of size tags*3 items (15 items for 3 tags 110'), then allocate representative items 116 proportionally to the selected tags 110'. For example, there may be 7, 5, 3 representative items 116 (15 items) respectively for three weighted tags 110' that were added to the inclusion list 202 (for example). These 7, 5, 3 representative items 116 form the inclusion list 202. Thus, by changing the makeup of the inclusion list 202, the recommendation engine 114 will put more emphasis on the representative items 116 (e.g., 7 representative items 116) behind the higher weighted tag 110', and less emphasis on the representative items 116 (e.g., 3 representative items 116) of another less weighted tag 110' (see FIG. 2's step 2b etc. . . . ). This results in the recommendation engine 114 producing recommended items 112 that are more similar to the higher weighted tag 110' rather than to the less weighted another tag 110'.

In the event, the user 101 adds tags 110' to the exclusion list 204 and weights those tags 110' then the same proportional process (if desired) could be performed as above except that the 7, 5, 3 representative items 116 (15 representative items 116) would form the exclusion list 204. Thus, by changing the makeup of the exclusion list 204, the recommendation engine 114 will put more emphasis on the representative items 116 (e.g., 7 representative items 116) behind the higher weighted tag 110', and less emphasis on the representative items 116 (e.g., 3 representative items 116) of the less weighted tag 110' (see FIG. 2's step 2b etc. . . . ). This results in the recommendation engine 114 producing more recommended items 112 that are not related to the higher weighted tag 110' rather than to the less weighted tag 110'.

To recap the alternate embodiment 1 case, the user 101 is basically allowed to not only determine that they wish to include (or exclude) a tag 110', but is also allowed to express a desire to make some tags 110' more important than other tags 110'. This bias of the selected tags 110' can be taken into account the recommender system 106 by selecting a different number of representative items 116 depending on how the user 110 distributes the importance for a certain tag 110' or lack thereof for a certain tag 110'. There are multiple ways of assigning importance to a selected tag 110 (for example); by pressing +/−, ordering, creating a ranked list, or pressing harder on a tag 110, to name a few. FIG. 5 is an illustration of the client device 102 exemplifying the tag selection for weighted tags 110' in the inclusion list 202 in accordance with an embodiment of the present disclosure. In this example, the user 101 had some method of increasing or decreasing the importance of a tag 110' (e.g., by pressing + or −). The higher weight a tag 110' had the more associated representative items 116 are selected for the recommendation engine 114 to process in determining the new recommendations 112. This illustration only shows tags 110' for the inclusion list 202 but could also involve tags 110' for the exclusion list 204.

Alternate Embodiment 2

Figure 6A:
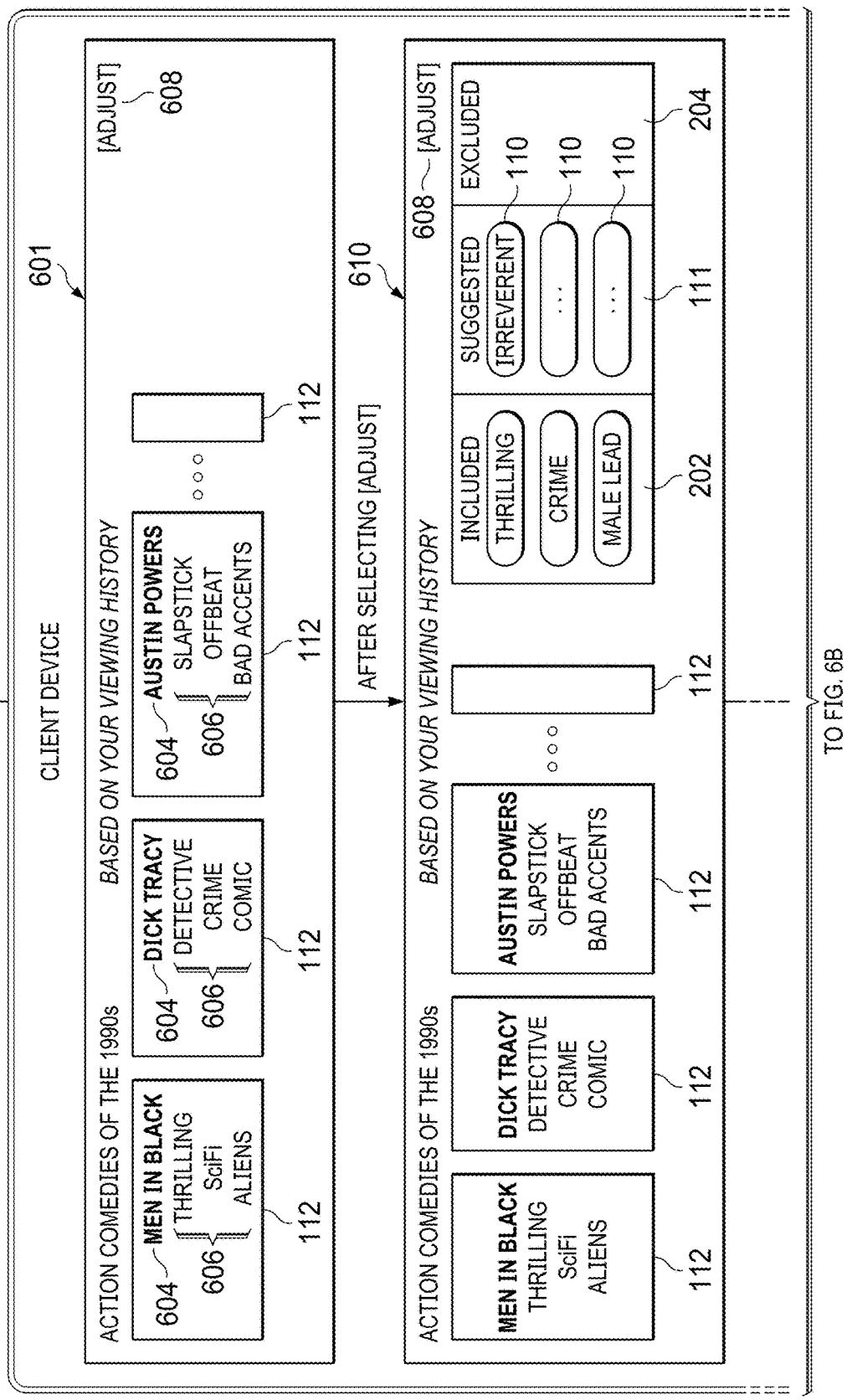
FIGS. 6A-6B is a diagram of yet another exemplary client device configured in accordance with an embodiment of the present disclosure.
Figure 6B:
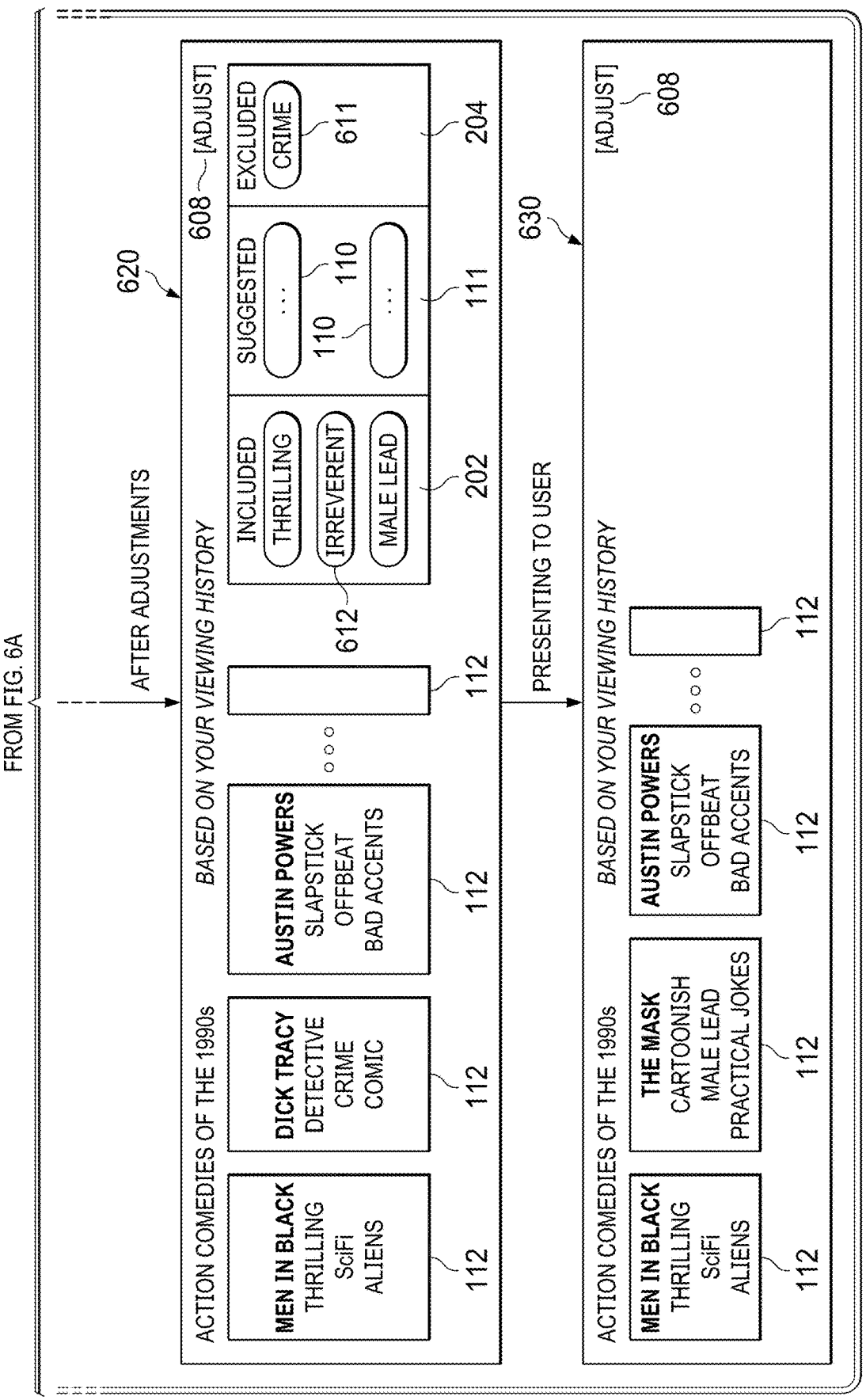

The system 100 can, in yet a different configuration, be used by the user 101 to alter existing recommendations 112 as discussed next with respect to an exemplary scenario shown in FIGS. 6A-6B. In FIGS. 6A-6B, the client device 102 at first is displaying one row 601 ("Action Comedies of the 1990s") of recommendations 112 where each recommendation 112 has a title 604 and corresponding tags 606. The user 101 can instantiate the solution of the present disclosure to alter the existing recommendations 112 by pressing the "adjust" element 608. Then following the arrow "after selecting [adjust]", the client device 102 displays a row 610 that presents the recommendations 112, the tag list 111 (including representative items 116), the inclusion list 202, and the exclusion list 204. Thereafter, the user 101 once presented with row 610 can interact with the tag list 111, the inclusion list 202, and the exclusion list 204. For example, the user 101 as shown in row 620 might choose to remove "Crime" tag 611 from the inclusion list 202 to the excluded list 204, and move the "Irreverent" tag 612 from the tag list 111 to the inclusion list 202. Then, based on this new information, the recommender system 106 can adjust the recommendations 112 by, for example, substituting one of the prior recommendations 112 such as "Dick Tracy" 112 with "The Mask" 112. This new information is presented to the user in row 630 following the arrow "Presenting to the User". It should be appreciated that FIGS. 6A-6B illustrate four rows 601, 610, 620 and 603 but this is only due to visual limitations where for the user 101 they would normally see just one row in which the contents are sequentially changing.

Recommender System 106

The present disclosure is versatile enough such that the recommender system 106 can support a number of different types of filtering techniques. For instance, the recommender system 106 can be configured to use both a collaborative filtering technique and a content filtering technique (note: a basic description about the collaborative filtering technique and the content filtering technique is provided below after the discussion about the advantages of the present disclosure). More specifically, the recommender system 106 can be configured to use the collaborative filtering technique to implement the inclusion features associated with the inclusion list 202 of the present disclosure, and further configured to use the content filtering technique to implement the exclusion features associated with the exclusion list 204 of the present disclosure. The usage of both filtering techniques can enhance the user experience. In this regard, we have from testing observed that users 101 are stricter with the exclusions than they are with the inclusions. To refer to an earlier example, the user 101 that included "fast paced" movies in their inclusion list 202 may be forgiving if The Butterfly Effect movie appears as a recommendation 112, even though they have a preference for action. Furthermore, our testing has shown that collaborative filtering provides what users 101 perceive as better inclusionary recommendations because the users 101 perceive collaborative filtering recommendations as providing similar but different enough movies to be interesting and evoke the feeling of serendipity, whereas content filtering does not elicit the same effect. However, when the user 101 decides to exclude a tag 100, they have shown in testing to be far less forgiving to recommended items 112 with either the excluded tag 110, or similar themes or tags. Content filtering can help address this issue, by excluding similar items so the recommender system 106 can be responsive to the intent of the user 101. For example, the user 101 may exclude the tag "violence" 110, and then the system 100 utilizing content filtering may also silently exclude movies that are similar to the violence tag 110, even though the excluded movies might not explicitly be tagged with "violence". The same characteristic that made content filtering less desirable for inclusion makes it perfectly suitable for exclusion since it excludes the least amount to satisfy the user 101, while allowing for broad discovery.

Figure 7:
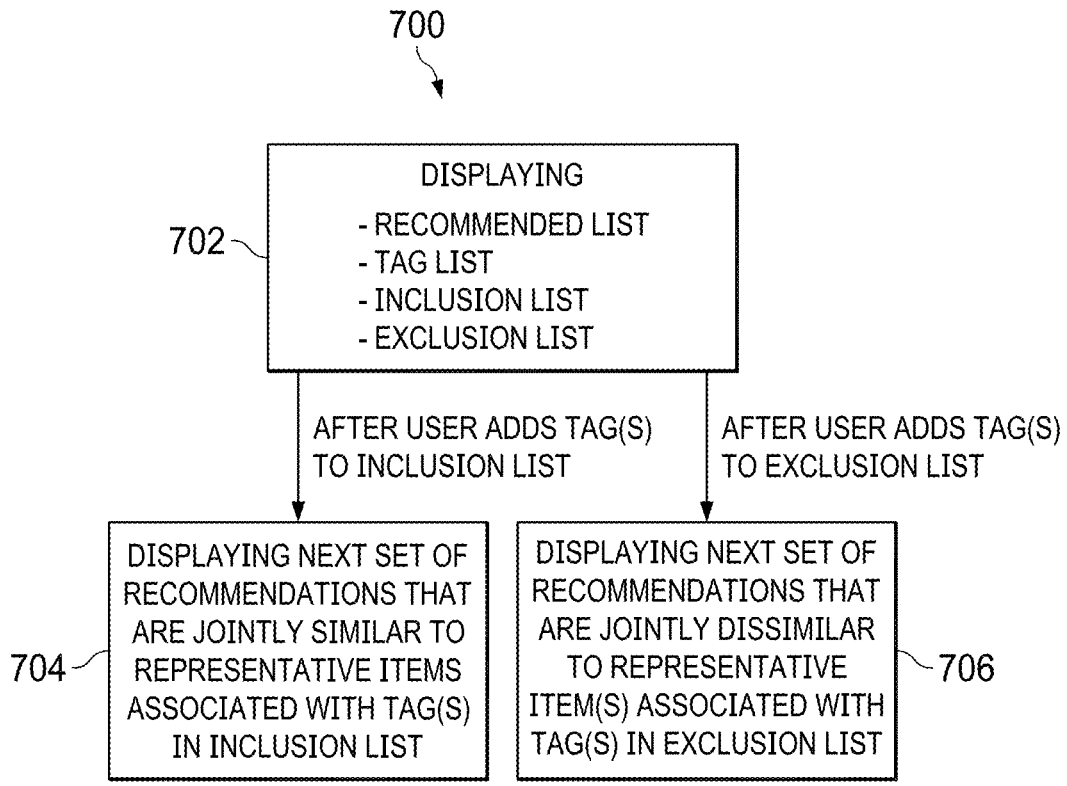
FIG. 7 is a flowchart of a method implemented in the client device in accordance with an embodiment of the present disclosure.

Referring to FIG. 7, there is a flowchart of a method 700 implemented in the client device 102 in accordance with an embodiment of the present disclosure. At step 702, the client device 102 runs the client application 104 which enables the user visible interface 105 to display: (1) the recommendations list 120 which includes a current set of recommendations 112; (2) the tag list 111 which includes a current set of tags 110 that are associated with the current set of recommendations 112, wherein each tag 110 has one or more representative items 116 associated therewith, and wherein each representative item 116 is associated with the user 101 of the client device 102 (note: the representative items 116 are not displayed on the user visible interface 105); (3) an inclusion list 202 in which the user 101 can add one or more tags 110 from the current set of tags 110 to narrow down a next set of recommendations 112; and (4) an exclusion list 204 in which the user 101 can add one or more tags 110 from the current set of tags 110 to broaden a next set of recommendations 112. At step 704, after the user 101 adds the one or more tags 110 to the inclusion list 202, the recommendations list 129 is updated to display the next set of recommendations 112 which includes one or more recommendations 112 that are jointly similar to the one or more representative items 116 associated with the one or more tags 110 added to the inclusion list 202 (note: the one or more tags 110 added to the inclusion list 202 can be weighted to indicate an importance level to the user 101 of the client device 102). If desired, before the recommendations list 120 is updated to display the next set of recommendations 112, the one or more representative items 116 associated with the one or more tags 110 added to the inclusion list 202 can be displayed as recommended items 112. At step 706, after the user 101 adds the one or more tags 110 to the exclusion list 204, the recommendations list 120 is updated to display the next set of recommendations 112 which includes one or more recommendations 112 that are jointly dissimilar to the one or more representative items 112 associated with the one or more tags 110 added to the exclusion list 204 (note: the one or more tags 110 added to the exclusion list 204 can be weighted to indicate an importance level to the user 101 of the client device 102). If desired, before the recommendations list 120 is updated to display the next set of recommendations 112, the recommended items 112 which share a tag 110 with the one or more representative items 116 associated with the one or more tags 110 added to the exclusion list 204 could be removed from the display of recommended items 112. It should be appreciated that the next set of recommendations 112 may include recommendations 112 selected based on both the tags 110 in the inclusion list 202 and the exclusion list 204. As discussed above, the one or more representative items 116 can include at least one of following (for example): (1) an item 116 previously purchased by the user 101; (2) an item 116 previously watched by the user 101; (3) an item 116 previously placed on a wish-list by the user 101; and (4) an item 116 recommended for the user 101.

Figure 8:
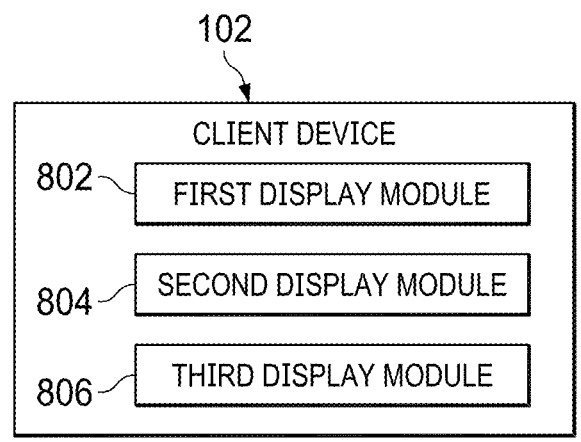
FIG. 8 is a basic diagram of an exemplary client device that is configured in accordance with an embodiment of the present disclosure.

Referring to FIG. 8, there is a block diagram illustrating structures of an exemplary client device 101 in accordance with an embodiment of the present disclosure. In one embodiment, the client device 101 comprises a first display module 802, a second display module 804, and a third display module 806. The first display module 802 is configured to display: (1) the recommendations list 120 which includes a current set of recommendations 112; (2) the tag list 111 which includes a current set of tags 110 that are associated with the current set of recommendations 112, wherein each tag 110 has one or more representative items 116 associated therewith, and wherein each representative item 116 is associated with the user 101 of the client device 102 (note: the representative items 116 are not displayed on the user visible interface 105); (3) an inclusion list 202 in which the user 101 can add one or more tags 110 from the current set of tags 110 to narrow down a next set of recommendations 112; and (4) an exclusion list 204 in which the user 101 can add one or more tags 110 from the current set of tags 110 to broaden a next set of recommendations 112. After the user 101 adds the one or more tags 110 to the inclusion list 202, the second display module 804 is configured to display the next set of recommendations 112 which includes one or more recommendations 112 that are jointly similar to the one or more representative items 116 associated with the one or more tags 110 added to the inclusion list 202 (note: the one or more tags 110 added to the inclusion list 202 can be weighted to indicate an importance level to the user 101 of the client device 102). If desired, before the recommendations list 120 is updated to display the next set of recommendations 112, the one or more representative items 116 associated with the one or more tags 110 added to the inclusion list 202 can be displayed as recommended items 112. After the user 101 adds the one or more tags 110 to the exclusion list 204, the third display module 806 is configured to display the next set of recommendations 112 which includes one or more recommendations 112 that are jointly dissimilar to the one or more representative items 112 associated with the one or more tags 110 added to the exclusion list 204 (note: the one or more tags 110 added to the exclusion list 204 can be weighted to indicate an importance level to the user 101 of the client device 102). If desired, before the recommendations list 120 is updated to display the next set of recommendations 112, the recommended items 112 which share a tag 110 with the one or more representative items 116 associated with the one or more tags 110 added to the exclusion list 204 could be removed from the display of recommended items 112. It should be appreciated that the client device 102 may also include other components, modules or structures which are well-known, but for clarity, only the components, modules or structures needed to describe the features of the present disclosure are described herein.

As those skilled in the art will appreciate, the above-described modules 802, 804, and 806 of the client device 102 may be implemented separately as suitable dedicated circuits. Further, the modules 802, 804, and 806 can also be implemented using any number of dedicated circuits through functional combination or separation. In some embodiments, the modules 802, 804, and 806 may be even combined in a single application specific integrated circuit (ASIC). As an alternative software-based implementation, the client device 102 may comprise a processor 808 (including but not limited to a microprocessor, a microcontroller or a Digital Signal Processor (DSP), etc.), and a memory 810. The memory 810 stores machine-readable program code executable by the processor 808 to cause the client device 102 to perform the steps of the above-described method 700.

Figure 9:
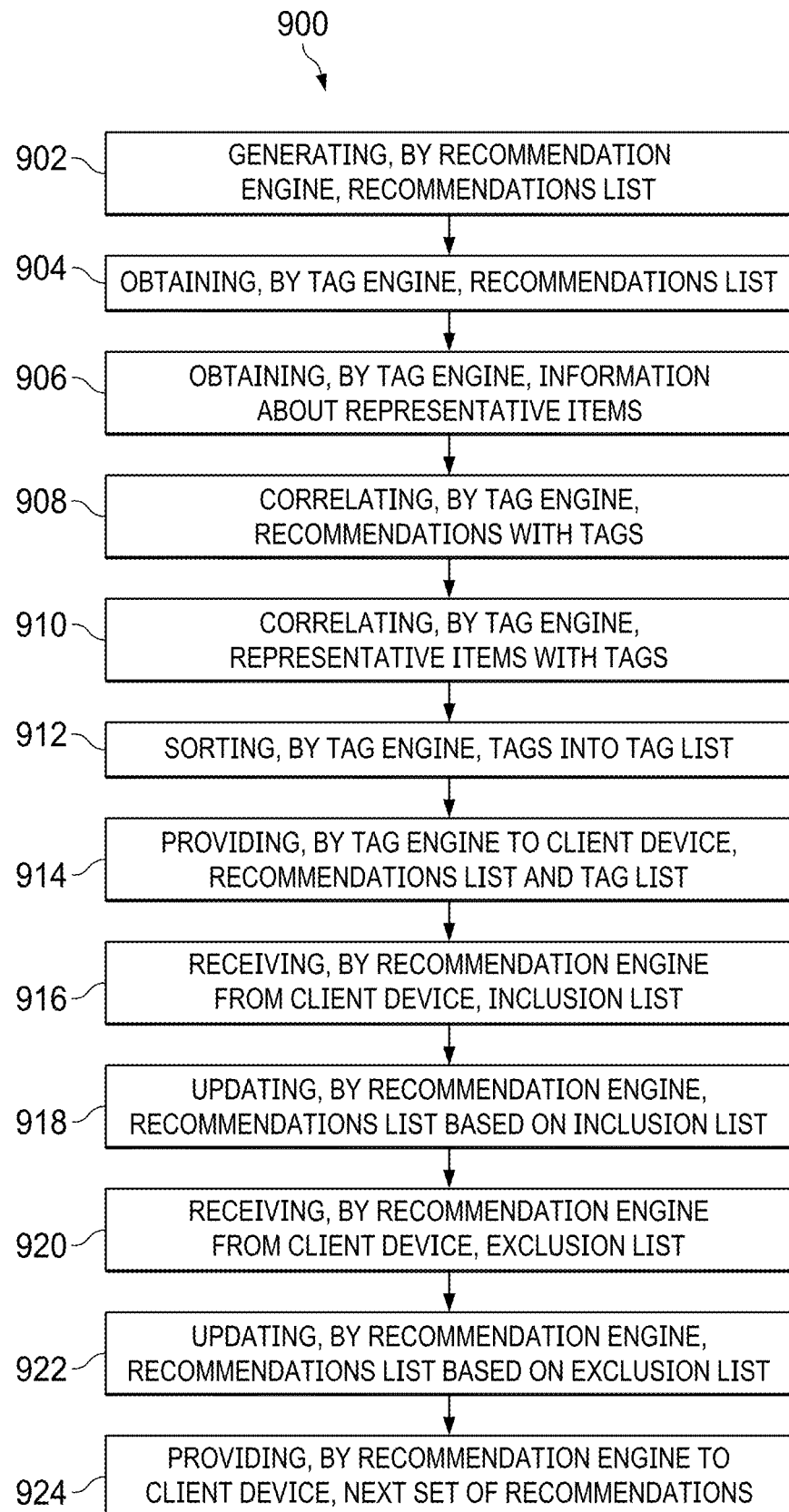
FIG. 9 is a flowchart of a method implemented in the recommender system in accordance with an embodiment of the present disclosure; and, FIG. 10 is a basic diagram of an exemplary recommender system that is configured in accordance with an embodiment of the present disclosure.

Referring to FIG. 9, there is a flowchart of a method 900 implemented in the recommender system 106 which comprises the recommendation engine 114 and the tag engine 128 in accordance with an embodiment of the present disclosure. At step 902, the recommendation engine 114 generates the recommendations list 120 which includes the current set of recommendations 112 for the user 101 of the client device 102. At step 904, the tag engine 128 obtains the recommendations list 120. At step 906, the tag engine 128 obtains information about representative items 116 associated with the user 101 of the client device 102. At step 908, the tag engine 128 correlates the recommendations 112 with tags 110. At step 910, the tag engine 128 correlates the representative items 116 with the tags 110 (note: steps 908 and 910 can be performed at same time since there is only one tag list 111). At step 912, the tag engine 128 sorts the tags 110 into the tag list 111. At step 914, the tag engine 128 provides the recommendations list 120 and the tag list 111 to the client device 102. At step 916, the recommendation engine 114 receives an inclusion list 202 containing one or more tags 110 that the user 101 of the client device 102 had selected from the provided tag list 110. Then at step 918, the recommendation engine 114 updates (using for instance a collaborative filtering technique) the recommendations list 120 to include a next set of recommendations 112 which include one or more recommendations 112 which are jointly similar to the one or more representative items 116 associated with the one or more tags 110 added to the inclusion list 202. At step 920, the recommendation engine 114 receives an exclusion list 204 containing one or more tags 110 that the user 101 of the client device 102 had selected from the provided tag list 111. Then at step 922, the recommendation engine 114 updates (using for instance a content filtering technique) the recommendations list 120 to include a next set of recommendations 112 which include one or more recommendations 112 which are jointly dissimilar to the one or more representative items 116 associated with the one or more tags 110 added to the exclusion list 204 (note 1: the recommendation engine 114 can receive both the inclusion list 202 and the exclusion list 204 at the same time) (note 2: the recommendation engine 114 could receive the inclusion list 202 and not the exclusion list 204 and vice versa assuming the user 101 only added tags 110 to one of the lists 202 and 204). At step 924, the recommendation engine 114 provides the next set of recommendations 112 (associated with steps 916/918 and/or 920/922) to the client device 102. As discussed above, the one or more representative items 116 can include at least one of following (for example): (1) an item 116 previously purchased by the user 101; (2) an item 116 previously watched by the user 101; (3) an item 116 previously placed on a wish-list by the user 101; and (4) an item 116 recommended for the user 101.

Figure 10:
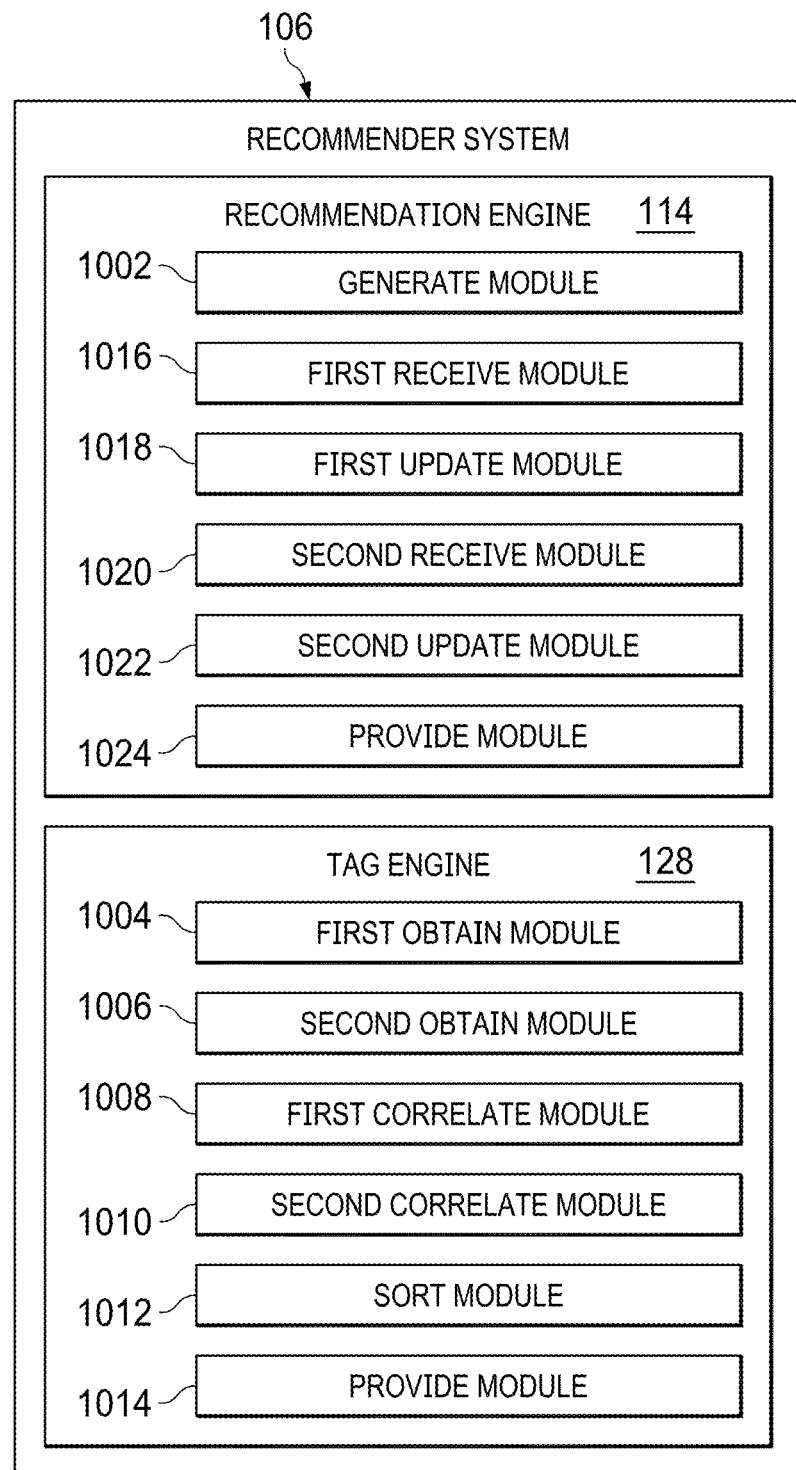

Referring to FIG. 10, there is a block diagram illustrating structures of an exemplary recommender system 106 which comprises the recommendation engine 114 and the tag engine 128 in accordance with an embodiment of the present disclosure. In one embodiment, the recommendation engine 114 comprises a generate module 1002, a first receive module 1016, a first update module 1018, a second receive module 1020, a second update module 1022, a provide module 1024. And, the tag engine 128 comprises a first obtain module 1004, a second obtain module 1006, a first correlate module 1008, a second correlate module 1010, a sort module 1012, and a provide module 1014. The recommendation engine's first generate module 1002 is configured to generate the recommendations list 120 which includes the current set of recommendations 112 for the user 101 of a client device 102. The tag engine's first obtain module 1004 is configured to obtain the recommendations list 120. The tag engine's second obtain module 1006 is configured to obtain information about representative items 116 associated with the user 101 of the client device 102. The tag engine's first correlate module 1008 is configured to correlate the recommendations 112 with tags 110. The tag engine's second correlate module 1010 is configured to correlate the representative items 116 with the tags 110. The tag engine's sort module 1012 is configured to sort the tags 110 into the tag list 111. The tag engine's provide module 1014 is configured to provide the recommendations list 120 and the tag list 111 to the client device 102. The recommendation engine's first receive module 1016 is configured to receive from the client device 102 an inclusion list 202 containing one or more tags 110 that the user 101 of the client device 102 had selected from the provided tag list 110. The recommendation engine's first update module 1018 is configured to update (using for instance a collaborative filtering technique) the recommendations list 120 to include a next set of recommendations 112 which include one or more recommendations 112 which are jointly similar to the one or more representative items 116 associated with the one or more tags 110 added to the inclusion list 202. The recommendation engine's second receive module 1020 is configured to receive an exclusion list 204 from the client device 102 containing one or more tags 110 that the user 101 of the client device 102 had selected from the provided tag list 111. The recommendation engine's second update module 1022 is configured to update (using for instance a content filtering technique) the recommendations list 120 to include a next set of recommendations 112 which include one or more recommendations 112 which are jointly dissimilar to the one or more representative items 116 associated with the one or more tags 110 added to the exclusion list 204. The recommendation engine's provide module 1024 provides the next set of recommendations 112 (associated with modules 1016/1018 and/or 1020/1022) to the client device 102. It should be appreciated that the recommender system 106 may also include other components, modules or structures which are well-known, but for clarity, only the components, modules or structures needed to describe the features of the present disclosure are described herein.

As those skilled in the art will appreciate, the above-described modules 1002, 1004, 1006, 1008, 1010, 1012, 1014, 1016, 1018, 1020, 1022, and 1024 of the recommender system 106 may be implemented separately as suitable dedicated circuits. Further, the modules 1002, 1004, 1006, 1008, 1010, 1012, 1014, 1016, 1018, 1020, 1022, and 1024 can also be implemented using any number of dedicated circuits through functional combination or separation. In some embodiments, the modules 1002, 1004, 1006, 1008, 1010, 1012, 1014, 1016, 1018, 1020, 1022, and 1024 may be even combined in a single application specific integrated circuit (ASIC). As an alternative software-based implementation, the recommender system 106 may comprise a processor 1030 (including but not limited to a microprocessor, a microcontroller or a Digital Signal Processor (DSP), etc.), and a memory 1032. The memory 1032 stores machine-readable program code executable by the processor 1030 to cause the recommender system 106 to perform the steps of the above-described method 900.

Advantages/Additional Features

Personalized input elements: The recommender system 106 assigns one or more representative items 116 (movies/titles 116) to each tag 110. Since, the representative item 116 (movie/title 116) carries a specific context (e.g., above example of Star Trek, Die Hard) along with it, the recommendation engine 114 receives more clues than the tag 110 itself on what kind of recommendations 112 to deliver to the user 101. The recommender system 106 can assign (correlate) one or more representative items 116 (movies/titles 116) to each tag 110 based on the following (for example): (1) the user's profile such as items the user 101 has watched, bought, wants to watch (wish-list), or items that the user 101 is believed to enjoy; and/or (2) popular representative items including popular items if the recommender system 106 does not have enough detail on the user 101. This action (i.e., adding representative items 116) results in adding an individual, personalized meaning to the tag 110 which results in bringing more relevant recommendations 112 to the user 101 in fewer steps thus enhancing the user experience.

Can use more recommendation methods than only tag similarity: Even with professionally applied tags 110, there is a probability that the tags 110 are still not uniformly applied. This problem becomes a near-certainty if the recommendation system was extended to include user-generated tags. With traditional tag-similarity (or tag-cloud) methods, one must rely on trying to cluster tags, and infer meaning from tags and groups thereof. In the present disclosure, the system 100 does not have this problem and can use any type of recommendation engine 114 in addition to (or not) the traditional tag-similarity (or tag-cloud) methods to produce the results, thus allowing for example the use of best-of-breed algorithms which can be varied and tested to see which algorithm(s) produces the best results.

Personalized Results: The traditional tag (or tag cloud) based system that makes, recommendations are configured to rely on the tags as an authority, and do not take the user's profile into account like in the present disclosure when making those recommendations. The reliance solely on tags to make recommendations is problematic since tags can be misleading, or the tags can have different meanings or different weights for different users. The present disclosure's system 100 addresses this problem by assigning representative items 116 (based on the user's profile) to the tags 110 which allows for the conversion of tags 110 and associated representative items 116 into recommendations 112 which are specifically associated with the user 101. For example, the present disclosure allows the recommendation engine 114 to use collaborative filtering (as an example) in making recommendations 112 which is a fundamental advantage in that this enables the recommendation engine 114 to figure out so called "latent factors", that is, figuring out the reasons why items are liked by similar users 101. This does not necessarily mean the items themselves are similar, but instead means more "If you liked X, you might like Y". Basically, the recommendation engine 114 using collaborative filtering helps find items 112 that the user 101 might like. For instance, take one user 101 with their given preferences may like "fast paced" movies because of action-packed scenes where the protagonists run, jump, traverse perilous obstacles or otherwise take part in exhilarating and adrenaline-pumping action. For a different user 101, those same words "fast paced" could refer to the speed of the plot, such as a fast-paced drama where the viewer never really manages to regain their footing before the next, shocking revelation. The present disclosure's system 100 can cater to each of these users 101 by taking into account their representative items 116 in making recommendations 112; for the first user 101, the representative items 116 could be Fast and Furious, Kill Bill, and Mad Max: Fury Road. Meanwhile, the second user 101 could have representative items 116 such as Martha Marcy May Marlene, Food Inc, and The Butterfly Effect. These representative items 116 may or may not be similar in theme, scope or type, such as by the presence of a documentary and a science fiction movie in the same list, but they should all have the thematic representation of the tag 110 allotted to them. More than that, the allotted tag 110 should have the representative items 116 that closely relates as much as possible to the user's own preferences.

Faster Results: Since the tags 110 of the present disclosure have one or more representative items 116 attached to them, it is possible to consider those representative items 116 as recommendations 112 in their own right. The client device 102 can, if needed, present a selection of the representative items 116 as recommended items 112, based on (for example) recent user interaction by placing certain tags 110 in the inclusion list 202, while consulting the recommender system 106 for a full new recommendations list 120 based on the inclusion list 202. This can present the user 101 with a result more rapidly than waiting for the recommender system 106 to perform the filtering and provide the recommendations 112 based at least in part on the representative items 116 of the selected tags 110. This would enhance the user experience since it will take the recommender system 106 time to perform, filter and provide recommendations 112 based on the representative items 116 since the recommender system 106 would also have to silently populate the client application's 104 background data, such as page two of the recommendations 112, add new representative items 116 to use for the tags 110, etc. . . . .

Customized Recommendations: Many traditional recommendation engines (e.g., Netflix's recommendation engine) are used to provide rows of recommendations lists which are clustered by some metric. At most, the traditional recommendation engines are able to provide simple explanations that may not cover why the recommendations 112 were generated in the first place. The present disclosure's system 100 can also translate the recommended items 112 (e.g., movies 112) that the recommendation engine 114 bases its guesses on into tags 110, but the user 101 can then use their client device 102 to manipulate the tags 110 if the recommendation 112 was incorrect in any given circumstance.

In view of the foregoing, one skilled in the art upon reading the present disclosure will readily appreciate that the disclosed system 100 provides a way to bridge a gap between the language of the user 100 and the language of the recommender system 106. This is important because these two languages do not inherently overlap. In one case, the disclosed system 100 can bridge this gap by using collaborative filtering as described above in a personalized manner for each user 101 thus allowing them to find interesting content faster, and increasing their satisfaction. Hence, the ability to use collaborative filtering (for example) for providing recommendations 112 based on tags 110 is an improvement over the state-of-the art. Plus, the translation between tags 110 and representative items 116 (movie items 116) such that the representative items 116 (movie items 116) represent items which are specific to the user 110 is also an improvement over the state-of-the-art. Finally, the system 100 has a unique feature to translate a recommendations list 120 to tags 110 and allow the user 101 to use those tags 110 to modify the initial recommendations 112 by selecting tags 110 and adding them to an inclusion list 202 and/or exclusion list 204. The system 100 also has many more unique features that are improvements over the state-of-the-art.

Collaborative Filtering: is a technique used to infer a user's opinion of an item based on other users' opinion. Collaborative filtering requires no knowledge of the item being discussed. The basic premise is that users with similar taste like similar items. Suppose we have three users, Alex, John and Jacob. All three of them have watched and liked (e.g., rated as five stars) Ash vs Evil Dead. Alex and Jacob have both watched and liked Despicable Me. When the system is asked for a recommendation for John, it may answer with Despicable Me because Alex and Jacob both liked it. The users do not need to be friends, or even know each-other. The collaborative filter does not know why Alex and Jacob liked Despicable Me instead it assumes there exists a reason, but the reason is not part of the algorithm's input. Alex and Jacob might even like it for unrelated reasons; Alex might like cartoons, while Jacob may like bad accents. To mitigate this, the collaborative filter may take a while to identify what users are similar to each-other. It may take five, ten, or even more data points to get a good profile for the user (for example, Jacob consistently liking movies with bad accents), and during that time the output may be generic, that is, merely provide most popular items which can be unreliable or even detrimental. This problem applies to new media items as well where without at least one user liking (or disliking) the item, it is not connected, and cannot be recommended. This problem is typically referred to as the "cold start" problem which is caused by the necessity, and time interval, from which a new user or new piece of content is introduced to when Collaborative Filtering can make reasonable predictions on or for it. A limitation of collaborative filtering is that it must operate on one or more media items and/or users to generate its output data. For example, it is not possible to ask a collaborative filtering model for "fast-paced movies", but it is trivial to ask it for other movies liked by the same group that liked Speed, Skyfall, and Die Hard.

Content Filtering is a technique that relies on item metadata, such as title, actors, writers, plot synopsis, tags, dates, and any other type of data that may describe an item. By using statistical analysis, it is possible for the content filter to infer whether two items are similar or not based on the correlation of their metadata; for example, if their plots are similar, if they star similar actors, if the writers are similar or have worked together, etc. . . . . A poster-child example could be Zucker, Abrahams and Zucker, three writers that at times collaborated, and at times worked solo, whose work retained a characteristic style.

In the above-description of various embodiments of the present disclosure, it is to be understood that the terminology used herein is for the purpose of describing particular embodiments only and is not intended to be limiting of the disclosure. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

The tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present disclosure may be embodied in hardware and/or in software (including firmware, resident software, microcode, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the disclosure. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the scope of the present disclosure.

The invention claimed is:

1. A client device comprising:
a client application which enables a user visible interface to display:
a recommendations list which includes a current set of recommendations; and
a tag list which includes a current set of tags that are associated with the current set of recommendations, wherein each tag has one or more representative items associated therewith, and wherein each representative item is associated with a user of the client device;
wherein the user visible interface further displays an inclusion list in which the user adds one or more tags from the current set of tags to narrow down a next set of recommendations;
wherein after the user adds the one or more tags to the inclusion list, the recommendations list is updated to display the next set of recommendations which includes one or more recommendations that are jointly similar to the one or more representative items associated with the one or more tags added to the inclusion list; and
wherein the next set of recommendations are determined by processing the one or more representative items assigned to the one or more tags which were added to the inclusion list instead of processing the one or more tags added to the inclusion list.

2. The client device of claim 1, wherein the one or more representative items include at least one of following: (1) an item previously purchased by the user; (2) an item previously watched by the user; (3) an item previously placed on a wish-list by the user; and (4) an item recommended for the user.

3. The client device of claim 1, wherein the one or more representative items are not displayed on the user visible interface.

4. The client device of claim 1, wherein before the recommendations list is updated to display the next set of recommendations, the one or more representative items associated with the one or more tags added to the inclusion list are displayed as recommended items.

5. The client device of claim 1, wherein the one or more tags added to the inclusion list are weighted to indicate an importance level to the user of the client device.

6. The client device of claim 1, wherein the user visible interface further displays an exclusion list in which the user adds one or more tags from the current set of tags to broaden a next set of recommendations.

7. The client device of claim 6, wherein after the user adds the one or more tags to the exclusion list, the recommendations list is updated to display the next set of recommendations which includes one or more recommendations that are jointly dissimilar to the one or more representative items associated with the one or more tags added to the exclusion list.

8. The client device of claim 7, wherein before the recommendations list is updated to display the next set of recommendations, the recommended items which share a tag with the one or more representative items associated with the one or more tags added to the exclusion list are no longer displayed as recommended items, wherein the next set of recommendations are determined by processing the one or more representative items assigned to the one or more tags which were added to the exclusion list instead of processing the one or more tags added to the exclusion list.

9. The client device of claim 6, wherein the one or more tags added to the exclusion list are weighted to indicate an importance level to the user of the client device.

10. A method implemented in a client device, the method comprising:
  displaying on a user visible interface the following:
    a recommendations list which includes a current set of recommendations; and
    a tag list which includes a current set of tags that are associated with the current set of recommendations, wherein each tag has one or more representative items associated therewith, and wherein each representative item is associated with a user of the client device;
  wherein the user visible interface further displays an inclusion list and the method further comprises enabling the user to add one or more tags from the current set of tags to the inclusion list to narrow down a next set of recommendations;
  wherein after the user adds the one or more tags to the inclusion list, the recommendations list is updated to display the next set of recommendations which includes one or more recommendations that are jointly similar to the one or more representative items associated with the one or more tags added to the inclusion list; and
  wherein the next set of recommendations are determined by processing the one or more representative items assigned to the one or more tags which were added to the inclusion list instead of processing the one or more tags added to the inclusion list.

11. The method of claim 10, wherein the one or more representative items include at least one of following: (1) an item previously purchased by the user; (2) an item previously watched by the user; (3) an item previously placed on a wish-list by the user; and (4) an item recommended for the user.

12. The method of claim 10, wherein the one or more representative items are not displayed on the user visible interface.

13. The method of claim 10, wherein before the recommendations list is updated to display the next set of recommendations, the one or more representative items associated with the one or more tags added to the inclusion list are displayed as recommended items.

14. The method of claim 10, wherein the one or more tags added to the inclusion list are weighted to indicate an importance level to the user of the client device.

15. The method of claim 10, wherein the user visible interface further displays an exclusion list and the method further comprises enabling the user to add one or more tags from the current set of tags to the exclusion list to broaden a next set of recommendations.

16. The method of claim 15, wherein after the user adds the one or more tags to the exclusion list, the recommendations list is updated to display the next set of recommendations which includes one or more recommendations that are jointly dissimilar to the one or more representative items associated with the one or more tags added to the exclusion list.

17. The method of claim 16, wherein before the recommendations list is updated to display the next set of recommendations, the recommended items which share a tag with the one or more representative items associated with the one or more tags added to the exclusion list are no longer displayed as recommended items, wherein the next set of recommendations are determined by processing the one or more representative items assigned to the one or more tags which were added to the exclusion list instead of processing the one or more tags added to the exclusion list.

18. The method of claim 15, wherein the one or more tags added to the exclusion list are weighted to indicate an importance level to the user of the client device.

19. A recommender system comprising:
  a recommendation engine configured to generate a recommendations list which includes a current set of recommendations for a user of a client device; and,
  a tag engine configured to: (1) obtain the recommendations list; (2) obtain information about representative items associated with the user of the client device; (3) correlate the recommendations with tags; (4) correlate the representative items with the tags; (5) sort the tags into a tag list; and (6) provide the recommendations list and the tag list to the client device;
  wherein the recommendation engine is further configured to: (1) receive an inclusion list containing one or more tags that the user of the client device had selected from the provided tag list; and (2) update the recommendations list to include a next set of recommendations which include one or more recommendations which are jointly similar to the one or more representative items associated with the one or more tags added to the inclusion list, and wherein the next set of recommendations are determined by processing the one or more representative items assigned to the one or more tags which were added to the inclusion list instead of processing the one or more tags added to the inclusion list; and,
  wherein the recommendation engine and the target engine are implemented by: (1) any number of dedicated circuits; (2) an application specific integrated circuit (ASIC); (3) a cloud environment including random access memory (RAM) and execution cores, or (4) a processor and a memory that stores processor-executable instructions, wherein the processor interfaces with the memory to execute the processor-executable instructions to operate the recommendation engine and the target engine.

20. The recommender system of claim 19, wherein the representative items include at least one of following: (1) an item previously purchased by the user; (2) an item previously watched by the user; (3) an item previously placed on a wish-list by the user; and (4) an item recommended by the recommendation engine for the user.

21. The recommender system of claim 19, where the recommendation engine utilizes a collaborative filtering technique to determine the one or more recommendations which are jointly similar to the one or more representative items associated with the one or more tags added to the inclusion list.

22. The recommender system of claim 19, the recommendation engine is further configured to: (1) receive an exclusion list containing one or more tags that the user of the client device had selected from the provided tag list; and (2) update the recommendations list to include a next set of recommendations which include one or more recommendations which are jointly dissimilar to the one or more representative items associated with the one or more tags added to the exclusion list, and wherein the next set of recommendations are determined by processing the one or more representative items assigned to the one or more tags which were added to the exclusion list instead of processing the one or more tags added to the exclusion list.

23. The recommender system of claim 22, where the recommendation engine utilizes a content filtering technique to determine the one or more recommendations which are jointly dissimilar to the one or more representative items associated with the one or more tags added to the exclusion list.

24. A method implemented in a recommender system which comprises a recommendation engine and a tag engine, the method comprising:
generating, by the recommendation engine, a recommendations list which includes a current set of recommendations for a user of a client device;
obtaining, by the tag engine, the recommendations list;
obtaining, by the tag engine, information about representative items associated with the user of the client device;
correlating, by the tag engine, the recommendations with tags;
correlate the representative items with the tags;
sorting, by the tag engine, the tags into a tag list;
providing, by the tag engine, the recommendations list and the tag list to the client device;
receiving, by the recommendation engine, an inclusion list containing one or more tags that the user of the client device had selected from the provided tag list; and
updating, by the recommendation engine, the recommendations list to include a next set of recommendations which include one or more recommendations which are jointly similar to the one or more representative items associated with the one or more tags added to the inclusion list, and wherein the next set of recommendations are determined by processing the one or more representative items assigned to the one or more tags which were added to the inclusion list instead of processing the one or more tags added to the inclusion list.

25. The method of claim 24, wherein the representative items include at least one of following: (1) an item previously purchased by the user; (2) an item previously watched by the user; (3) an item previously placed on a wish-list by the user; and (4) an item recommended by the recommendation engine for the user.

26. The method of claim 24, where the recommendation engine utilizes a collaborative filtering technique to determine the one or more recommendations which are jointly similar to the one or more representative items associated with the one or more tags added to the inclusion list.

27. The method of claim 24, further comprising:
receiving, by the recommendation engine, an exclusion list containing one or more tags that the user of the client device had selected from the provided tag list; and
updating, by the recommendation engine, the recommendations list to include a next set of recommendations which include one or more recommendations which are jointly dissimilar to the one or more representative items associated with the one or more tags added to the exclusion list, and wherein the next set of recommendations are determined by processing the one or more representative items assigned to the one or more tags which were added to the exclusion list instead of processing the one or more tags added to the exclusion list.

28. The method of claim 27, where the recommendation engine utilizes a content filtering technique to determine the one or more recommendations which are jointly dissimilar to the one or more representative items associated with the one or more tags added to the exclusion list.

* * * * *